US010386023B2

(12) United States Patent
Myers et al.

(10) Patent No.: US 10,386,023 B2
(45) Date of Patent: Aug. 20, 2019

(54) LED LIGHT FIXTURE AND ASSEMBLY METHOD THEREFOR

(71) Applicant: UNITY OPTO TECHNOLOGY CO., LTD., New Taipei (TW)

(72) Inventors: J. Richard Myers, Pasadena, CA (US); Arthur B. Moore, Arcadia, CA (US)

(73) Assignee: Unity Opto Technology Co., Ltd. (TW)

( * ) Notice: Subject to any disclaimer, the term of this patent is extended or adjusted under 35 U.S.C. 154(b) by 2 days.

(21) Appl. No.: 15/269,694

(22) Filed: Sep. 19, 2016

(65) Prior Publication Data

US 2017/0009942 A1    Jan. 12, 2017

Related U.S. Application Data

(63) Continuation of application No. 14/254,822, filed on Apr. 16, 2014, now Pat. No. 9,476,552.
(Continued)

(51) Int. Cl.
*F21V 7/04* (2006.01)
*F21K 9/275* (2016.01)
(Continued)

(52) U.S. Cl.
CPC .............. *F21K 9/275* (2016.08); *F21K 9/278* (2016.08); *F21S 8/026* (2013.01); *F21S 8/04* (2013.01);
(Continued)

(58) Field of Classification Search
CPC ...... F21V 17/107; F21V 21/04; F21V 21/043; F21V 21/047; F21S 8/02; F21S 8/022;
(Continued)

(56) References Cited

U.S. PATENT DOCUMENTS 3,892,959 A    7/1975   Pulles
4,975,809 A    12/1990  Ku
(Continued)

FOREIGN PATENT DOCUMENTS

CN    201225561 Y    4/2009
CN    201513783 U    6/2010
(Continued)

OTHER PUBLICATIONS

B & P Lamp, Universal Circle Crossbar, Aug. 14, 2012, Amazon.*
(Continued)

*Primary Examiner* — Matthew J. Peerce
(74) *Attorney, Agent, or Firm* — Eric L. Sophir; Dentons US LLP

(57) ABSTRACT

An LED panel light fixture and method for assembling the same includes (a) selecting a set of specifications of the LED panel light fixture, the set of specifications comprising a fixture/base specification comprising a form factor of the LED panel light fixture; and a top specification comprising a visual feature of a top in accordance with the top specification; (b) providing a knock-down kit having parts including the top in accordance with the top specification, a frame in accordance with the fixture/base specification, an optically transmissive panel assembly, a set of light emitting diodes (LEDs), and driving circuitry; and (c) assembling the LED panel light fixture using parts of the knock-down kit. An LED panel lighting fixture kit includes a top and a base. The base includes a mounting mechanism that is accessible before joining the top to the base, but not accessible after joining the top to the base.

7 Claims, 14 Drawing Sheets

Related U.S. Application Data

(60) Provisional application No. 61/812,973, filed on Apr. 17, 2013, provisional application No. 61/894,472, filed on Oct. 23, 2013.

(51) Int. Cl.
*F21S 8/02* (2006.01)
*F21S 8/04* (2006.01)
*F21V 15/01* (2006.01)
*F21V 8/00* (2006.01)
*F21K 9/278* (2016.01)
*F21V 3/00* (2015.01)
*F21V 17/12* (2006.01)
*F21V 23/00* (2015.01)
*F21V 23/04* (2006.01)
*F21V 23/06* (2006.01)
*F21Y 101/00* (2016.01)
*F21Y 103/10* (2016.01)
*F21Y 115/10* (2016.01)

(52) U.S. Cl.
CPC ............... *F21V 3/00* (2013.01); *F21V 15/01* (2013.01); *F21V 17/12* (2013.01); *F21V 23/005* (2013.01); *F21V 23/04* (2013.01); *F21V 23/06* (2013.01); *G02B 6/0031* (2013.01); *G02B 6/0051* (2013.01); *G02B 6/0081* (2013.01); *G02B 6/0083* (2013.01); *F21Y 2101/00* (2013.01); *F21Y 2103/10* (2016.08); *F21Y 2115/10* (2016.08); *Y10T 29/49117* (2015.01)

(58) Field of Classification Search
CPC ....... F21S 8/024; F21S 8/026; F21Y 2105/10; F21K 9/275; F21K 9/278
USPC .......................................................... 362/608
See application file for complete search history.

(56) References Cited

U.S. PATENT DOCUMENTS

| | | |
|---|---|---|
| 5,027,258 A | 6/1991 | Schoniger et al. |
| 5,276,591 A | 1/1994 | Hegarty |
| 5,375,043 A | 12/1994 | Tokunaga |
| 5,636,462 A | 6/1997 | Kleiman |
| 5,641,219 A | 6/1997 | Mizobe |
| 5,806,972 A | 9/1998 | Kaiser et al. |
| 6,042,243 A | 3/2000 | Grill et al. |
| 6,072,280 A | 6/2000 | Allen |
| 6,095,660 A | 8/2000 | Moriyama et al. |
| 6,231,213 B1 | 5/2001 | Schmidt et al. |
| 6,240,665 B1 | 6/2001 | Brown et al. |
| 6,641,283 B1 | 11/2003 | Bohler |
| 6,739,734 B1 | 5/2004 | Hulgan |
| 6,758,573 B1 | 7/2004 | Thomas et al. |
| 6,840,646 B2 | 1/2005 | Cornelissen et al. |
| 6,880,963 B2 | 4/2005 | Luig et al. |
| 6,997,576 B1 | 2/2006 | Lodhie et al. |
| 7,015,987 B2 | 3/2006 | Wu et al. |
| 7,090,387 B2 | 8/2006 | Kohno |
| 7,114,841 B2 | 10/2006 | Aanegola et al. |
| 7,172,324 B2 | 2/2007 | Wu et al. |
| 7,201,488 B2 | 4/2007 | Sakamoto et al. |
| 7,217,004 B2 | 5/2007 | Park et al. |
| 7,236,155 B2 | 6/2007 | Han et al. |
| 7,374,327 B2 | 5/2008 | Schexnaider |
| 7,387,403 B2 | 6/2008 | Mighetto |
| 7,445,369 B2 | 11/2008 | Yu et al. |
| 7,448,768 B2 | 11/2008 | Sloan et al. |
| 7,473,022 B2 | 1/2009 | Yoo |
| 7,547,112 B2 | 6/2009 | Kim |
| 7,563,015 B2 | 7/2009 | Tzung-Shiun |
| 7,570,313 B2 | 8/2009 | Wu et al. |
| 7,583,901 B2 | 9/2009 | Nakagawa et al. |
| 7,604,389 B2 | 10/2009 | Sakai et al. |
| 7,708,447 B2 | 5/2010 | Tobler et al. |
| 7,722,221 B2 | 5/2010 | Chae |
| 7,726,617 B2 | 6/2010 | Zambelli et al. |
| 7,752,790 B1 | 7/2010 | Michael et al. |
| 7,766,536 B2 | 8/2010 | Peifer et al. |
| 7,787,070 B2 | 8/2010 | Choi et al. |
| 7,814,341 B1 | 10/2010 | Corder |
| 7,825,892 B2 | 11/2010 | Lin et al. |
| 7,894,013 B2 | 2/2011 | Chung et al. |
| 7,918,598 B2 | 4/2011 | Peifer et al. |
| 8,029,293 B2 | 10/2011 | Janos et al. |
| 8,061,867 B2 | 11/2011 | Kim et al. |
| D653,376 S | 1/2012 | Kong et al. |
| 8,092,034 B2 | 1/2012 | Zarian et al. |
| 8,092,069 B2 | 1/2012 | Chuang et al. |
| 8,096,671 B1 | 1/2012 | Cronk et al. |
| 8,136,958 B2 | 3/2012 | Verfuerth et al. |
| 8,167,627 B1 | 5/2012 | Janos et al. |
| 8,443,535 B2 | 5/2013 | Liu et al. |
| 8,915,636 B2 | 12/2014 | Araki et al. |
| 9,062,867 B2 | 6/2015 | Rodgers et al. |
| 9,068,704 B2 | 6/2015 | Burton et al. |
| 9,206,964 B2 | 12/2015 | Marsh et al. |
| 2004/0240230 A1 | 12/2004 | Kitajima et al. |
| 2005/0082453 A1 | 4/2005 | Chuang |
| 2005/0174755 A1 | 8/2005 | Becker |
| 2005/0180172 A1 | 8/2005 | Jang |
| 2005/0219860 A1 | 10/2005 | Schexnaider |
| 2006/0022214 A1 | 2/2006 | Morgan et al. |
| 2006/0158906 A1 | 7/2006 | Parker |
| 2006/0291238 A1 | 12/2006 | Epstein et al. |
| 2006/0291241 A1 | 12/2006 | Wojtowicz et al. |
| 2007/0000849 A1 | 1/2007 | Lutz et al. |
| 2007/0047262 A1 | 3/2007 | Schardt et al. |
| 2007/0076431 A1 | 4/2007 | Atarashi et al. |
| 2007/0097227 A1 | 5/2007 | Toyokawa |
| 2007/0115402 A1 | 5/2007 | Zhang et al. |
| 2007/0165424 A1 | 7/2007 | Sakai |
| 2007/0171670 A1 | 7/2007 | Zagar et al. |
| 2007/0222914 A1 | 9/2007 | Kotchick et al. |
| 2007/0247414 A1 | 10/2007 | Roberts |
| 2007/0247842 A1 | 10/2007 | Zampini et al. |
| 2007/0247870 A1 | 10/2007 | Sakai et al. |
| 2008/0013303 A1 | 1/2008 | Guarino |
| 2008/0101094 A1 | 5/2008 | Spada et al. |
| 2008/0170398 A1* | 7/2008 | Kim .................... F21V 21/002 362/260 |
| 2008/0231196 A1 | 9/2008 | Weng et al. |
| 2008/0297679 A1 | 12/2008 | Jung et al. |
| 2009/0097277 A1 | 4/2009 | Iwasaki |
| 2009/0135608 A1 | 5/2009 | Sell |
| 2009/0147504 A1 | 6/2009 | Teeters |
| 2009/0147507 A1 | 6/2009 | Verfuerth et al. |
| 2009/0213589 A1 | 8/2009 | Peifer et al. |
| 2009/0316396 A1* | 12/2009 | Tsai .................... F21K 9/00 362/235 |
| 2009/0323334 A1 | 12/2009 | Roberts et al. |
| 2010/0061108 A1 | 3/2010 | Zhang |
| 2010/0124064 A1 | 5/2010 | Ogawa et al. |
| 2010/0142202 A1* | 6/2010 | Sugishita ............... F21S 8/026 362/235 |
| 2010/0157610 A1 | 6/2010 | Xiao et al. |
| 2010/0165241 A1 | 7/2010 | Kim et al. |
| 2010/0171145 A1 | 7/2010 | Morgan et al. |
| 2010/0172138 A1 | 7/2010 | Richardson |
| 2010/0176742 A1 | 7/2010 | Lee et al. |
| 2010/0237798 A1 | 9/2010 | Wolf et al. |
| 2010/0254121 A1* | 10/2010 | Zhou .................... G02B 6/0043 362/147 |
| 2010/0284185 A1 | 11/2010 | Ngai |
| 2010/0289428 A1 | 11/2010 | Frazier et al. |
| 2010/0315833 A1 | 12/2010 | Holman et al. |
| 2011/0068708 A1* | 3/2011 | Coplin .................... F21K 9/00 315/294 |
| 2011/0075414 A1 | 3/2011 | Van De Ven et al. |
| 2011/0096565 A1* | 4/2011 | Wang .................... G02B 6/0043 362/607 |

(56) References Cited

U.S. PATENT DOCUMENTS

| | | | |
|---|---|---|---|
| 2011/0138665 A1 | 6/2011 | Liu | |
| 2011/0149596 A1 | 6/2011 | Lv et al. | |
| 2011/0249427 A1* | 10/2011 | Rooms | F21S 8/026 362/147 |
| 2011/0279063 A1 | 11/2011 | Wang et al. | |
| 2011/0291569 A1 | 12/2011 | Shin et al. | |
| 2012/0020109 A1 | 1/2012 | Kim et al. | |
| 2012/0081889 A1 | 4/2012 | Frost et al. | |
| 2012/0091919 A1 | 4/2012 | Tveit | |
| 2012/0106177 A1 | 5/2012 | Blankestijn et al. | |
| 2012/0106198 A1* | 5/2012 | Lin | G02B 6/0083 362/609 |
| 2012/0182733 A1 | 7/2012 | Cho | |
| 2012/0218746 A1 | 8/2012 | Winton | |
| 2012/0287631 A1 | 11/2012 | Sheng | |
| 2012/0320627 A1* | 12/2012 | Araki | F21S 8/04 362/608 |
| 2012/0328242 A1 | 12/2012 | Hesse | |
| 2013/0038211 A1 | 2/2013 | Kang | |
| 2013/0044512 A1 | 2/2013 | Araki et al. | |
| 2013/0070455 A1 | 3/2013 | Tsui et al. | |
| 2013/0258706 A1 | 10/2013 | Urtiga et al. | |
| 2014/0071687 A1* | 3/2014 | Tickner | F21V 21/03 362/294 |
| 2014/0240966 A1 | 8/2014 | Garcia et al. | |
| 2014/0313780 A1 | 10/2014 | Myers | |
| 2014/0376266 A1 | 12/2014 | Myers | |
| 2015/0049512 A1 | 2/2015 | Myers et al. | |

FOREIGN PATENT DOCUMENTS

| | | |
|---|---|---|
| CN | 201628158 U | 11/2010 |
| CN | 201724032 U | 1/2011 |
| DE | 102006001981 A1 | 8/2007 |
| DE | 102008003703 A1 | 7/2009 |
| DE | 202009007334 U1 | 9/2009 |
| DE | 102009021846 A1 | 12/2010 |
| DE | 102010006465 A1 | 8/2011 |
| DE | 102010008359 A1 | 8/2011 |
| DE | 202012103430 U1 | 9/2012 |
| EP | 1059484 A1 | 12/2000 |
| EP | 1906081 A1 | 4/2008 |
| EP | 2088835 A1 | 8/2009 |
| EP | 2131100 A1 | 12/2009 |
| EP | 1361391 B1 | 4/2010 |
| EP | 2270387 B1 | 9/2011 |
| EP | 2495490 A2 | 9/2012 |
| JP | 2004271734 A | 9/2004 |
| JP | 2004335426 A | 11/2004 |
| JP | 2006106212 A | 4/2006 |
| JP | 3140783 U | 4/2008 |
| JP | 2011138731 A | 7/2011 |
| WO | 2009017117 A1 | 2/2009 |
| WO | 2009102563 A1 | 8/2009 |
| WO | 2010133535 A1 | 11/2010 |
| WO | 2012113005 A1 | 8/2012 |
| WO | 2012125605 A2 | 9/2012 |
| WO | 2012158894 A2 | 11/2012 |
| WO | 2012158908 A2 | 11/2012 |

OTHER PUBLICATIONS

Google Translation of DE 202012103430 U1—downloaded from www.google.com/patents on Oct. 18, 2014; 10 pages.
Google Translation of DE 102010006465A1—downloaded from www.google.com/patents on Nov. 1, 2013; 4 pages.
Google Translation of EP 2270387 B1—downloaded from www.google.com/patents on Nov. 5, 2013; 7 pages.
Google Translation of DE 102010008359 AI—downloaded from www.google.com/patents on Oct. 17, 2013; 16 pages.
Google Translation of EP 1361391 A2—downloaded from www.google.com/patents on Oct. 17, 2013; 6 pages.
Google Translation of EP 1059484 AI—downloaded from www.google.com/patents on Oct. 17, 2013; 17 pages.
Thomson Scientific translation of WO 2009017117 AI—enclosed with international search report for international application No. PCT/US2014/033953, dated Aug. 13, 2014; 24 pages.
Google Translation of WO 2012/113005 AI—downloaded from www.google.com/patents on Oct. 17, 2013; 5 pages.
Computer generated English translation of Registered Utility Model No. 3140783, transcribed from the Japan Platform of Patent Information, https://www.jplatpatinpit.go.jp/web/all/top/BTnnTopEnglishPage, on Apr. 22, 2016, 11 pages.
Computer generated English translation of Patent Application Laid-open No. 2011-138731, transcribed from the Japan Platform of Patent Information, https://www.jplatpatinpit.go.jp/web/all/top/13TnnTopEnglishPage, on Apr. 22, 2016, 32 pages.
Google Translation of CN 201628158—downloaded from www.google.com/patents on Sep. 22, 2015; 3 pages.
EPO—Google translation of German Laid-Open Patent Application DE102006001981A1, submitted with Request for Reexamination of U.S. Pat. No. 9,423,113.
EPO—Google translation of German Laid-Open Patent Application DE102008003703A1, submitted with Request for Reexamination of U.S. Pat. No. 9,423,113.
EPO—Google translation of German Laid-Open Patent Application DE102009021846A1, submitted with Request for Reexamination of U.S. Pat. No. 9,423,113.
Power Integrations—DER-384—Oct. 2013 https://led-driver.power.com/sites/default/files.PDFFiles/der384.pdf?Adsource=Aden_EEW%3felqTrack=true3futm_source=EEWeb&utm_medium=TechCommunity&utm_term=2014&utm._content=Content&utm_campaign=PowerIntegrations, 35 pages.
Request for ex parte Reexamination of U.S. Pat. No. 9,335,036.
Order granting ex parte Reexamination of U.S. Pat. No. 9,335,036, U.S. Appl. No. 90/014,104.
Request for ex parte Reexamination of U.S. Pat. No. 9,447,954.
Order granting ex parte Reexamination of U.S. Pat. No. 9,447,954, U.S. Appl. No. 90/014,105.
Request for ex parte Reexamination of U.S. Pat. No. 9,423,113.
Order granting ex parte Reexamination of U.S. Pat No. 9,423,113, U.S. Appl. No. 90/014,106.
Request for ex parte Reexamination of U.S. Pat. No. 9,523,487.
Order granting ex parte Reexamination of U.S. Pat. No. 9,523,487, U.S. Appl. No. 90/014,107.
Power Integrations, Inc., Design Example Report DER-256, cited as prior art reference in Ex Parte Reexamination Requests for U.S. Pat. Nos. 9,423,113; 9,335,036; and 9,923,487.
International Preliminary Report on Patentability, dated Oct. 20, 2015, corresponding to International Patent Application No. PCT/US2014/033352, 11 pages.
International Preliminary Report on Patentability, dated Oct. 20, 2015, corresponding to International Patent Application No. PCT/US2014/033953, 8 pages.
Communication and Annex from the Examining Division, dated Sep. 17, 2015, corresponding to European Patent Application No. 12 726 949.6, 5 pages.
Patent Cooperation Treaty, "International Search Report", International Search Report for International Application No. PCT/US2012/038338, dated Feb. 18, 2013, 7 pages.
Patent Cooperation Treaty, Invitation to Pay Additional Fees and, Where Applicable, Protest Fee, Partial International Search Report for International Application No. PCT/US2012/038315, dated Sep. 19, 2012, 9 pages.
Patent Cooperation Treaty, "International Search Report", International Search report for International Application No. PCT/US2012/038315, dated Feb. 13, 2013, 9 pages.
International Application No. PCT/US12/38315 International Preliminary Report on Patentability and Written Opinion of the International Searching Authority, dated Nov. 19, 2013, attached to International Publication No. WO2012/158894, Nov. 22, 2012, 12 pages.

(56) References Cited

OTHER PUBLICATIONS

International Application No. PCT/US12/38338 International Preliminary Report on Patentability and Written Opinion of the International Searching Authority, dated Nov. 19, 2013, attached to International Publication No. WO2012/158908, Nov. 22, 2012, 11 pages.
Patent Cooperation Treaty, "Invitation to Pay Additional Fees and, Where Applicable, Protest Fee", Partial International Search Report for International Application No. PCT/US2014/033352, dated Aug. 11, 2014, 6 pages.
Patent Cooperation Treaty, "Notification of Transmittal of International Search Report and the Written Opinion of the International Searching Authority", International Search Report for International Application No. PCT/US2014/033953, dated Aug. 13, 2014, 12 pages.
European Patent Office, "Communication Pursuant to Article 94(3) EPC", Examination Report for European Patent Application 12726949. 6, dated Feb. 2, 2015, 2 pages.
European Patent Office, Annex to the Communication Pursuant to Article 94(3) EPC Examination.
Notice of the Reason for Refusal, dated Mar. 15, 2016, corresponding to Japanese Patent Application No. 2014-511528, 7 pages.
English Translation of the Notice of the Reason for Refusal, dated Mar. 15, 2016, corresponding to Japanese Patent Application No. 2014-511528, 6 pages.
Examination Search Report, dated Dec. 11, 2015, corresponding to Canadian Patent Application No. 2,835,213, 3 pages.
Canadian Intellectual Property Office, Examiner's Report under Subsection 30(2) of the Patent Rules, Examination Report for Canadian Patent Application No. 2,835,213, dated Apr. 22, 2015, 4 pages.
Notice of the Reason for Refusal, dated Sep. 21, 2015, corresponding to Chinese Patent Application No. 201280024002.3, 10 pages.
English Translation of the Notice of the Reason for Refusal, dated Sep. 21, 2015, corresponding to Chinese Patent Application No. 201280024002.3, 8 pages.
Notice of the Reason for Refusal, dated Oct. 30, 2015, corresponding to Chinese Patent Application No. 201280023544.9, 6 pages.
English Translation of the Notice of the Reason for Refusal, dated Oct. 30, 2015, corresponding to Chinese Patent Application No. 201280023544.9, 9 pages.
Canadian Intellectual Property Office, Examiner's Report under Subsection 30(2) of the Patent Rules, Examination Report for Canadian Patent Application No. 2,835,213, dated Jun. 30, 2016, 4 pages.

* cited by examiner

LED LIGHT FIXTURE AND ASSEMBLY METHOD THEREFOR

CROSS REFERENCE TO RELATED APPLICATIONS

The present application is a continuation of U.S. Ser. No. 14/254,822, entitled "LED LIGHT FIXTURE AND ASSEMBLY METHOD THEREFOR," filed Apr. 16, 2014. The present application claims benefit of U.S. Provisional Application. No. 61/812,973 filed Apr. 17, 2013, entitled "LIGHTING ASSEMBLY," which is incorporated by reference in its entirety. The present application also claims benefit of U.S. Provisional Application. No. 61/894,472 filed Oct. 23, 2013, entitled "LED LIGHT FIXTURE AND MANUFACTURING METHOD THEREFOR," which is incorporated by reference in its entirety.

INCORPORATION BY REFERENCE

The present application incorporates by reference the following patent applications in their entireties:

U.S. Pat. Pub. No. 20130044512, entitled "FLAT PANEL LIGHTING DEVICE AND RETROFIT KIT," published Feb. 21, 2013 (Ser. No. 13/473,918, filed May 17, 2012), U.S. Pat. Pub. No. 2012032062, entitled "FLAT PANEL LIGHTING DEVICE AND DRIVING CIRCUITRY," published Dec. 20, 2012 (Ser. No. 13/473,929, filed May 17, 2012).

BACKGROUND OF THE INVENTION

1. Field of the Invention

The present invention relates generally to solid state lighting, such as light emitting diode (LED) lighting, and more particularly to an LED light fixture and manufacturing method therefor.

2. Description of the Related Art

LEDs have advantages over alternative lighting technologies including the robustness and reliability inherent in solid state devices, the lack of toxic chemicals that can be released during accidental breakage or disposal, instant-on capabilities, dimmability, and the lack of audible noise. The cost of LED luminaires is being reduced with the continuous development of the LED illuminating technology. LED light sources can be adapted to a wide range of lighting applications traditionally served by conventional technologies such as incandescent and fluorescent illumination, and it is desirable to provide manufacturing techniques to facilitate the development of novel LED lighting apparatus. The present disclosure provides methods of manufacturing LED lighting apparatus, and in particular LED lighting apparatus with a flat, thin form factor, using flexible, efficient assembly techniques.

SUMMARY OF THE INVENTION

In an embodiment, an LED (light emitting diode) panel lighting fixture comprises a top, comprising a top frame including a bezel surrounding a light emitting area; an LED strip comprising a plurality of LEDs disposed within a first channel at a first edge of the top frame and adjacent an edge surface of an optically transmissive panel; and the optically transmissive panel, for distribution of light received from the LED strip at the edge surface of the optically transmissive panel to the light emitting area; a base, the base including a base frame, wherein the top frame and the base frame are separate parts and the top frame is configured to be joined to the base frame to form an assembled frame; an LED driver disposed within an edge channel of the assembled frame at a second edge of the top frame, the LED driver being configured to convert an AC power input from an external AC power supply to a DC power output for the LED strip; and a universal cross bar, wherein the base is configured to be installed to the universal cross bar.

In an embodiment, an LED (light emitting diode) panel lighting fixture, comprises a top, comprising a top frame defining a bezel surrounding a light emitting area; an LED strip comprising a plurality of LEDs disposed within a first channel adjacent a first edge of an optically transmissive panel; and the optically transmissive panel, for redirecting light received from the LED strip at the first edge to be projected from the optically transmissive panel at the light emitting area; a base, the base including a base frame, wherein the top frame and the base frame are separate parts and the top frame is joined to the base frame to form an assembled frame, wherein the base includes a central opening, and wherein the first channel is located at a first edge of the assembled frame; an LED driver disposed within a second channel between a second edge of the optically transmissive panel and a second edge of the assembled frame, the LED driver being configured to convert an AC power input from an external AC power supply to a DC power output for the LED strip; a mounting mechanism for installing the base to a universal cross bar; and AC input wiring carrying AC power in from the external AC power supply to the LED driver, wherein the AC input wiring is routed into the base through the central opening of the base.

In an embodiment, an LED (light emitting diode) panel lighting fixture, comprises a top, comprising a top frame including a bezel surrounding a light emitting area; an LED strip comprising a plurality of LEDs disposed within a first channel at a first edge of the top frame and adjacent an edge surface of an optically transmissive panel; and the optically transmissive panel, for distribution of light received from the LED strip at the edge surface of the optically transmissive panel to the light emitting area; a base, the base including a base frame, wherein the top frame and the base frame are separate parts and the top frame is configured to be joined to the base frame to form an assembled frame; an LED driver disposed within an edge channel of the assembled frame at a second edge of the top frame, the LED driver being configured to convert an AC power input from an external AC power supply contained in an electrical box to a DC power output for the LED strip; and a universal cross bar, configured to be secured to the electrical box containing the external AC power supply.

In one embodiment, the present invention is embodied as an LED (light emitting diode) panel lighting fixture kit including a top and a base. The top includes a light emitting area and a joining mechanism for joining the top to the base. The base includes a mounting mechanism that is accessible before joining the top to the base, but that is not accessible after joining the top to the base. At least one of the top and the base includes an optically transmissive panel assembly, a set of light emitting diodes (LEDs), and driving circuitry.

In one aspect of the LED panel lighting fixture kit, the mounting mechanism comprises mechanical fasteners for surface mounting of the base, these mechanical fasteners being accessible from an upper surface of the base prior to joining the top to the base. Alternatively, the mounting mechanism may comprise a mechanism for mounting the base within a recess, and the top includes a trim ring for sealing the recess.

In another aspect of the LED panel lighting fixture kit, the optically transmissive panel assembly, the set of light emitting diodes (LEDs), and the driving circuitry are included in the base.

In another embodiment of the LED panel lighting fixture kit, the optically transmissive panel assembly and the set of light emitting diodes (LEDs) are included in the top, and the driving circuitry is included in the base. The driving circuitry may be configured to convert an AC power input to a DC power output, wherein the top includes an LED driver electrical connector coupled to the set of light emitting diodes (LEDs), and the base includes a power source electrical connector coupled to the DC power output of the driving circuitry. The LED driver electrical connector and the power source electrical connector preferably are configured to be coupled to each other during joining of the top to the base.

In a further aspect of the LED panel lighting fixture kit, the set of light emitting diodes (LEDs) may be located in a narrow edge channel at the periphery of the optically transmissive panel assembly, and the top may include a narrow bezel surrounding the light emitting area.

In another embodiment, the present invention includes a method for producing an LED panel light fixture. The method includes (a) selecting a set of specifications of the LED panel light fixture, the set of specifications comprising a fixture/base specification comprising a form factor of the LED panel light fixture; and a top specification comprising a visual feature of a top in accordance with the top specification; (b) providing a knock-down kit having parts including the top in accordance with the top specification, a frame in accordance with the fixture/base specification, an optically transmissive panel assembly, a set of light emitting diodes (LEDs), and driving circuitry; and (c) assembling the LED panel light fixture using the parts of the knock-down kit.

In one aspect of the method for producing an LED panel light fixture, in the step of assembling the LED panel light fixture the optically transmissive panel assembly, the set of light emitting diodes (LEDs), and the driving circuitry are contained within the frame and are covered by the top. In another aspect, the step of selecting a set of specifications further includes selecting a component specification, the component specification comprising a requirement for at least one of the optically transmissive panel assembly, a set of light emitting diodes (LEDs), and the driving circuitry. In a further aspect, in the step of selecting a set of specifications, the component specification is an optically transmissive panel requirement selected from the group consisting of non-directional, a beam angle, and a peak angle.

In another aspect of the method for producing an LED panel light fixture, in the step of selecting a set of specifications, the fixture/base specification is selected from the group consisting of a size of the LED panel light fixture, fixture/base configuration; and a form factor of an accessory for the LED panel light fixture. In yet another aspect, the top includes a bezel, and wherein in the step of selecting a set of specifications, the top specification is selected from the group consisting of a bezel configuration, and a finish of the top. In a further aspect, in the step of selecting a set of specifications, a fixture/base specification is a fixture/base configuration selected from the group consisting of a mounting technique for the LED panel light fixture, an ingress protection (IP) rating, serviceable, and non-serviceable.

In a further embodiment, the present invention is embodied as a method for assembling an LED panel light fixture. The method includes (a) pre-assembling a base assembly; (b) selecting a top from a plurality of top alternatives that are compatible with the base assembly; and, (c) joining the selected top to the base assembly. The base assembly includes: i. a base frame having a bottom surface and an edge wall; ii. an optically transmissive panel assembly disposed within the base frame; iii. a set of light emitting diodes (LEDs) extending adjacent an edge surface of the optically transmissive panel assembly; and, iv. driving circuitry disposed within the frame and operatively coupled to the set of LEDs. The optically transmissive panel assembly receives light from the set of light emitting diodes (LEDs) and emits light from a lighting area at a top surface of the base assembly.

In one aspect of the method for assembling an LED panel light fixture, the method further comprises the step, prior to joining the selected top to said base assembly, of inserting a component into the base assembly. In another aspect, the step of inserting a component into the base assembly comprises inserting a component onto a top surface of the base assembly. In another aspect, the step of inserting a component into the base assembly comprises inserting a component through an opening in an edge wall of the base assembly.

In a further aspect of the method for assembling an LED panel light fixture, the step of selecting a top from a plurality of top alternatives that are compatible with the base assembly comprises selecting a top with an edge wall portion that mates with the edge wall of the base frame when joining the selected top to said base assembly. In yet another aspect, in the joining step the edge wall portion of the top and the edge wall of the base frame form an engineering fit.

In another aspect of the method for assembling an LED panel light fixture, in the joining step the edge wall portion of the top is fastened to the edge wall of the base frame. In another aspect, in the joining step the selected top is permanently joined to the base assembly. In a further aspect, in the joining step the selected top is removably joined to the base assembly.

In yet another aspect of the method for assembling an LED panel light fixture, in the selecting step the selected top has a different size than the base assembly. In still another aspect, the step of pre-selecting the base assembly is effected at a first production facility, and the step of joining the selected top to the base assembly is effected at a second production facility.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

The same elements or parts throughout the figures of the drawings are generally designated by the same reference characters, while various equivalent elements bear a prime designation.

DETAILED DESCRIPTION OF THE INVENTION

Figure 1:
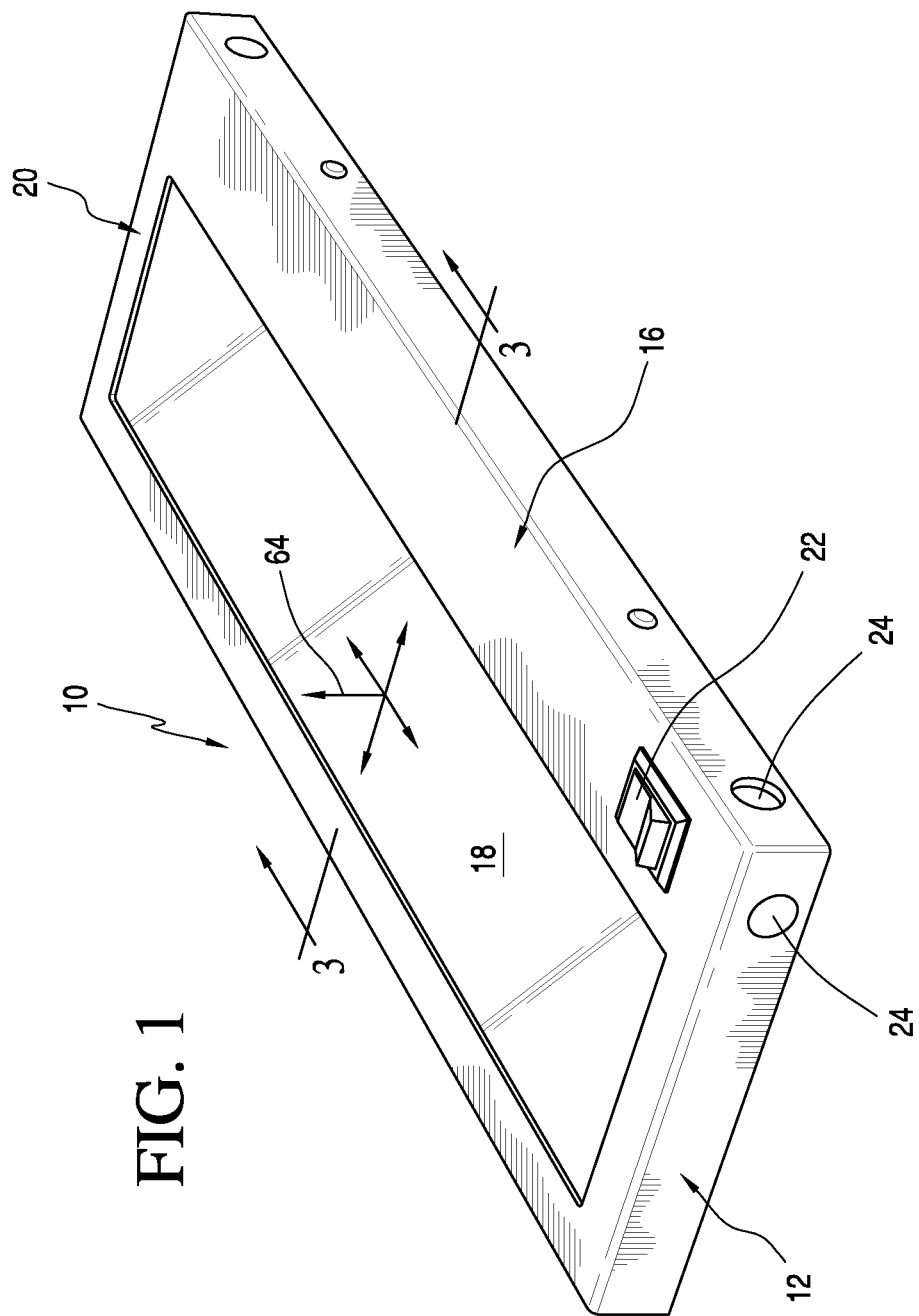
FIG. 1 is a perspective illustration of an embodiment of the LED light fixture of the present invention.
Figure 2:
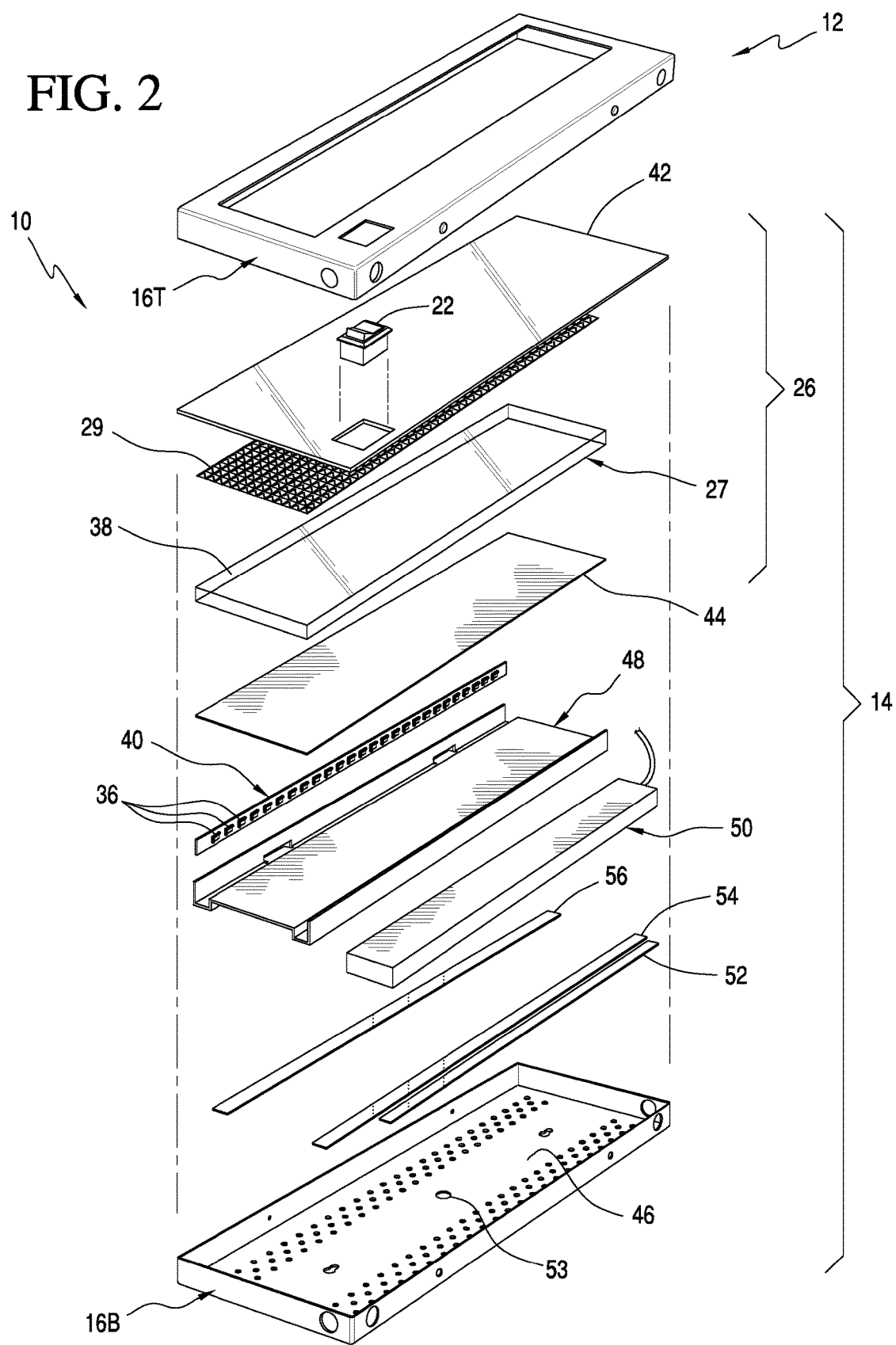
FIG. 2 is an exploded perspective view of the light fixture of FIG. 1.
Figure 3:
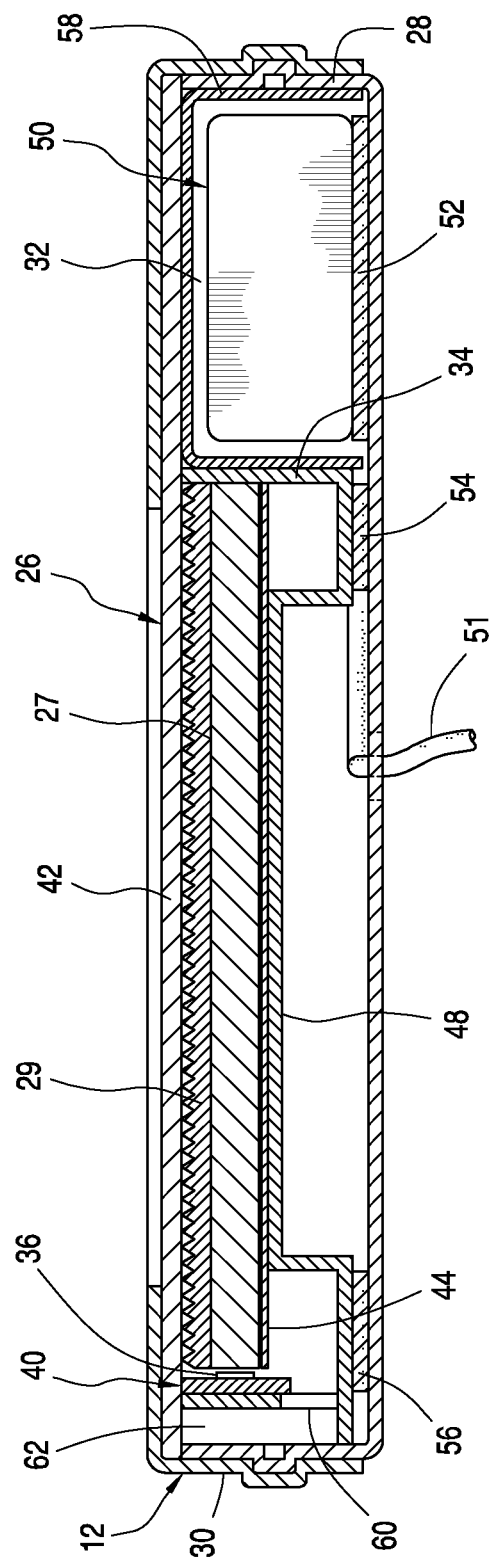
FIG. 3 is a cross-sectional view of the light fixture, taken along line 3-3 of FIG. 1.
Figure 4:
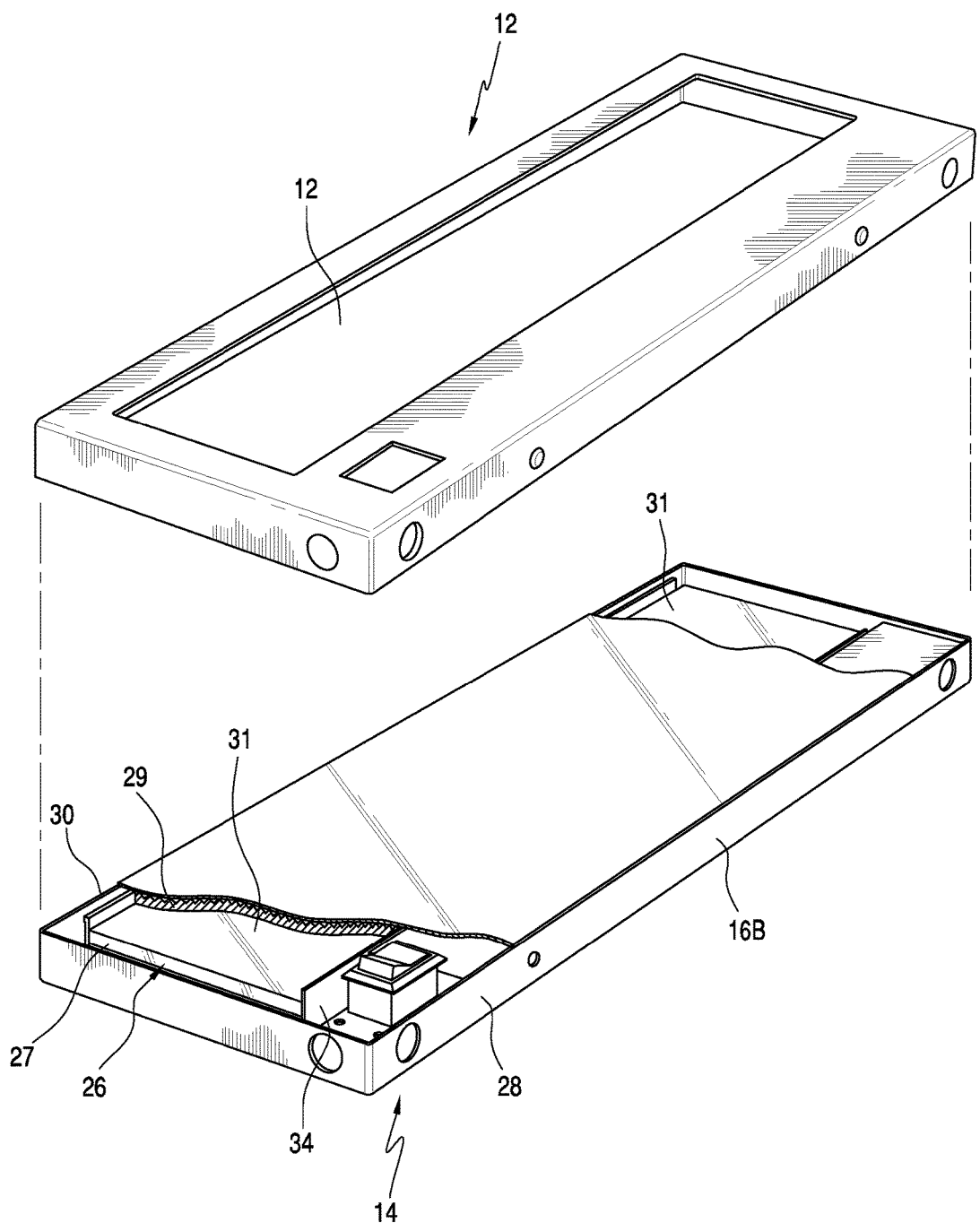
FIG. 4 is a perspective view of a base assembly and top prior to joining to produce the LED light fixture of FIG. 1, wherein the base assembly is seen in cutaway to reveal certain components thereof.

Referring now to the drawings and the characters of reference marked thereon, FIGS. 1-5 illustrate an exemplary embodiment of an LED light fixture, designated generally as 10, produced using the method of assembly of the present invention. As seen in FIGS. 1, 2 and 4, the light fixture 10 includes a top 12 (also referred to as top assembly 12), comprising an uppermost structure of light fixture 10. Light is emitted from an emission area 18 at a front surface of the light fixture 10. (In referring to the light-emitting surface of light fixture 10 as seen in perspective views such as FIG. 1 the present patent application uses the term "front" surface, and alternatively describes this surface as a "top" or "upper" structure of the light fixture 10 for example with reference to elevation or sectional views such as FIG. 3. The term "top" does not necessarily signify that this part of the LED panel light fixture is the upper structure in installation or use; for example in the ceiling lighting installation of FIG. 13 the top is the lower structure. In the present embodiment, the emission area 18 has a substantially rectangular aperture; wherein "aperture" indicates linear dimension(s) of the emission area, such as length and width of a rectangular emission area, or diameter of a circular emission area. The top 12 includes a bezel 20 surrounding the emission area 18. The bezel 20 of top 12 provides a picture-frame like border for the emission area 18, and may serve as a cover structure for interior components of light fixture 10.

In addition to the top 12 the light fixture 10 includes a base 14 (also referred to as base assembly 14). The present invention provides a method of assembling light fixture 10 wherein the base 14 is pre-assembled, and the top 12 is subsequently joined to the base assembly 14. In the assembly method of the invention as typically practiced, the top is joined to the base as a final stage of manufacture, prior to installation of the fully assembled light fixture by a user. In an alternative method, the user installs the pre-assembled base prior to joining top to base, and the user joins top to base during the installation process, not as a manufacturing step.

In the embodiment of FIGS. 1-5, base 14 is pre-assembled with all components of light fixture 10 except the top 12. Base 14 includes a base frame 16B, which contains: an optically transmissive panel assembly 26; a set of light emitting diodes (LEDs) 36 extending adjacent an edge surface of the optically transmissive panel assembly, sometimes referred to as an LED bar or LED strip; and driving circuitry 50 disposed within the base frame. The driving circuitry 50 is operatively coupled to the set of light emitting diodes (LEDs), and in use of the LED light fixture 10 is operatively coupled to a power supply external to the light fixture to power the set of LEDs. The optically transmissive panel assembly receives light from the set of LEDs and emits light from a lighting area 31 at a top surface of the base assembly.

A frame 16 (e.g. collectively, in some embodiments, including base frame 16B and a top frame 16T) provides structural support for the various components of the light fixture 10. In one embodiment, the top 12 comprises a portion of a frame, i.e. top frame 16T. The components of base 14 may include another portion of frame, i.e. base frame 16B. Thus, as used in the present patent application, "frame" may refer to an exterior supporting structure included in top 12 (this exterior supporting structure also sometimes called a top frame), and/or an exterior supporting structure included in base 14 (this exterior supporting structure also sometimes called base frame). The frame 16 may include additional features such as appropriate openings 24 and/or other cutaways for access by wires or other electrical connectors, such as wiring carrying AC power in, and wiring carrying DC power out. The front surface of the top frame 16T may support a switch 22.

In a preferred construction of light fixture 10, the frame 16 is comprised of a metal, a metal alloy, or a composite material including a metal. For example, the frame may be comprised of ferrous metals, or non-ferrous metals such as aluminum, brass, bronze, copper, and stainless steel. The frame may include a surface treatment such as electroplating or powder coating. Surface treatments for improved durability, such as rust-proofing, may be applied to frame 16. In the embodiment of FIGS. 1-5 in which top 12 serves as the exterior surface (except for the back surface) of light fixture 10, the surface material of the top frame 16T may be selected in part for its decorative finish, whereas the base frame 16B may comprise a plain material. In an alternative construction of light fixture 10, the frame may be comprised of an engineering plastic material, or of composite of metal and plastic.

LED light fixture 10 may take on a variety of sizes and form factors, including, but not limited to, rectangular, other polygonal (e.g., octagonal), circular and elliptical form factors. For example, the light fixture can be square with a size of approximately nine inches by nine inches, approximately twelve inches by twelve inches, or approximately twenty-four inches by twenty-four inches. By way of additional example, the light fixture 10 also can be rectangular (as in FIG. 1) with a size of approximately one foot by four feet or a size of approximately two feet by four feet. The LED light fixture 10 can take on any lateral size, while maintaining a relatively small thickness, without departing from the scope of the disclosed technology.

Basic Method of Assembling LED Panel Light Fixture from Base and Top

Figure 6:
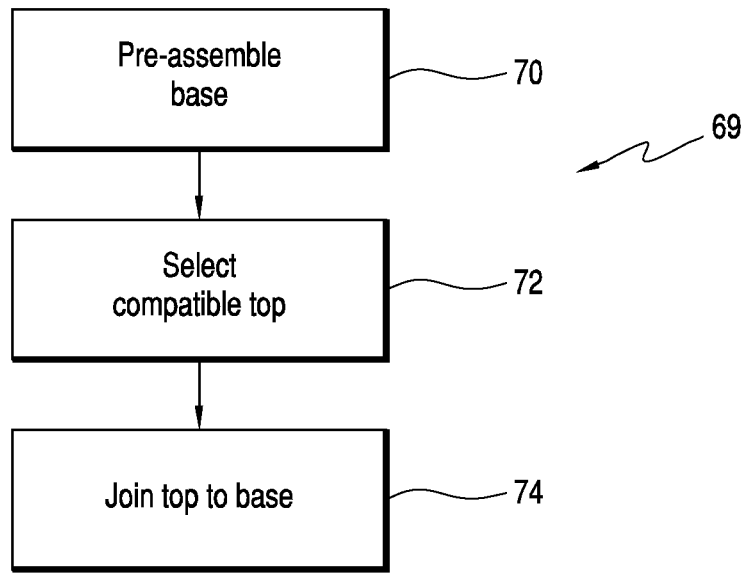
FIG. 6 is a flowchart schematic diagram of a light fixture assembly method in accordance with one aspect of the invention.

The basic steps of the present method of assembly, i.e. method of fitting together component parts of an LED panel light fixture, are shown at 69 in FIG. 6. At step 70, the base assembly 14 is pre-assembled. As used herein, "pre-assemble" signifies assembly of base 14 in a separate assembly operation at a prior point in time. Base 14 may be assembled at a separate production facility and at a different geographic location than the facility and location of steps 72 and 74. Base 14 may be assembled, stored in inventory, and subsequently removed from inventory for completion of the assembly method 69 of FIG. 6. Other techniques known in knock-down manufacture may be applied to the present assembly method.

At step 72, a top 12 is selected from a plurality of top alternatives that are compatible with the base 14, for example in compatible form factors of base and top (as used in this patent application, "form factor" refers to the size, style, shape, and visible features of the LED panel light fixture and of the base and top of this lighting fixture). Top 12 and base 14 should have compatible sizes or dimensions, such as matching lengths and widths (although similar but not matching lengths and widths also are possible; cf. FIG. 11). If top 12 includes a bezel 20 surrounding an emission area 18, the emission area and the lighting area 31 also should be dimensionally compatible, so that these areas will be aligned after joining top to base. Emission area 18 may have the same configuration as lighting area 31, or may be smaller than lighting area 31 (see, e.g. FIG. 11). Top 12 and base 14 should share the same mechanism by which top 12 will be joined to base 14 at step 74. Top 12 and base 14 also may share additional mechanical features, such as the structures housing switch 22 seen in FIGS. 1, 2. (Compare the embodiment of FIG. 2 with the alternative light fixture 10' shown in FIG. 8, which does not include switch 22 and its associated structures in the top 12, base 14, and other components.)

At step 74, the selected top 12 is joined to base assembly 14. The joining of top to base may be designed to be permanent, or may be removable, depending on requirements of the LED panel light fixture 10. For example, in some applications it may be desirable to remove top 12 from base 14 to permit maintenance of the light fixture 10. In the embodiment of FIGS. 1-5, base 14 and top 12 each include edge walls of a frame 16, configured so that the top frame 16T fits around the base frame 16B. The top 12 is lowered onto the base 14 (FIG. 4), and the respective edge walls are joined in an engineering fit. These edge walls may include mating structures (not shown) to provide a compression fit. Additional LED panel light fixture embodiments, with alternative mechanisms for joining base assembly to top, are disclosed below following a detailed description of layout and components of the base assembly 14 in the embodiment of FIGS. 1-5.

A wide range of known methods for joining materials, including in particular methods for joining metal parts, may be used in joining top 12 to base 14. Fit (or "engineering fit") refers to the mating of two mechanical components, in the present instance the binding together of base and top as a single unit. An interference fit, also known as a press fit or friction fit, fastens base to top by friction after these parts are pushed together. The security of an interference fit can be increased by configuring mating metallic structures of base and top so that these mating structures are under compression after joining. Another method of joining base to top uses fasteners or other hardware devices that mechanically join or affix objects together. Additional methods of joining base to top include crimping, welding, soldering, brazing, taping, adhesives, and combinations of these methods.

The joining of top 12 to base 14 can be removable or non-removable (permanent). A removable joint is desirable where one wishes to allow a user or technician to open the LED panel light fixture to permit the lighting fixture to be serviced or repaired in the field (sometimes called "serviceable" lighting fixtures). If the base and top are non-removably joined, the LED panel light fixture would be secure but "non-serviceable," as is desired in many applications.

Having further reference to FIGS. 1-3 and 5, the frame 16 includes a first edge wall 28 and a second edge wall 30, each extending along the length of lighting fixture 10. A first edge channel 32 is defined within the frame 16 adjacent the first edge wall 28. The first edge channel 32 is between the first edge wall 28 and a first inner wall 34. The first edge channel 32 preferably has a width of 18 mm or less, in some embodiments 15 mm or less, and in certain (most compact) embodiments 12 mm or less. In this embodiment, edge wall portions of frame 16 include the first edge wall 28 and second edge wall portions comprise overlapping structures that are mated during the joining of top 12 to base 14. (Note, as used in the present patent application, the term "edge wall portion" is sometimes used interchangeably with "edge wall" to refer to an edge wall of frame 16 or a part or portion of that edge wall.) The frame structure defining the inner edge wall in this embodiment is the base frame 16B while the top frame serves to reinforce the edge walls of frame 16. Light fixture 10 may include additional edge channel(s) (not shown) adjacent other edge walls of frame 16.

As described herein the driving circuitry 50, shown in highly schematic form in FIG. 2, may have a compact configuration compatible with narrow widths of first edge channel 32 as described above. For example, driving circuitry may have dimensions of approximately 20 cm in length, approximately 15 mm of width and approximately 15 mm in height. It will be appreciated that the disclosed technology is not limited to these exemplary dimensions. The first edge channel 32 can take on other dimensions without departing from the scope of the disclosed technology. Such compact driving circuitry 50 can be obtained by employing miniaturized power and/or control boards.

An optically transmissive panel assembly, designated generally as 26, is disposed within the frame 16. A strip of light emitting diodes (LEDs) 36 is arrayed in proximity to the second edge wall 30 and adjacent an edge surface 38 of the optically transmissive panel assembly 26. The optically transmissive panel assembly 26 receives light from the set of LEDs 36 and emits light from the lighting area 31.

Figure 5:
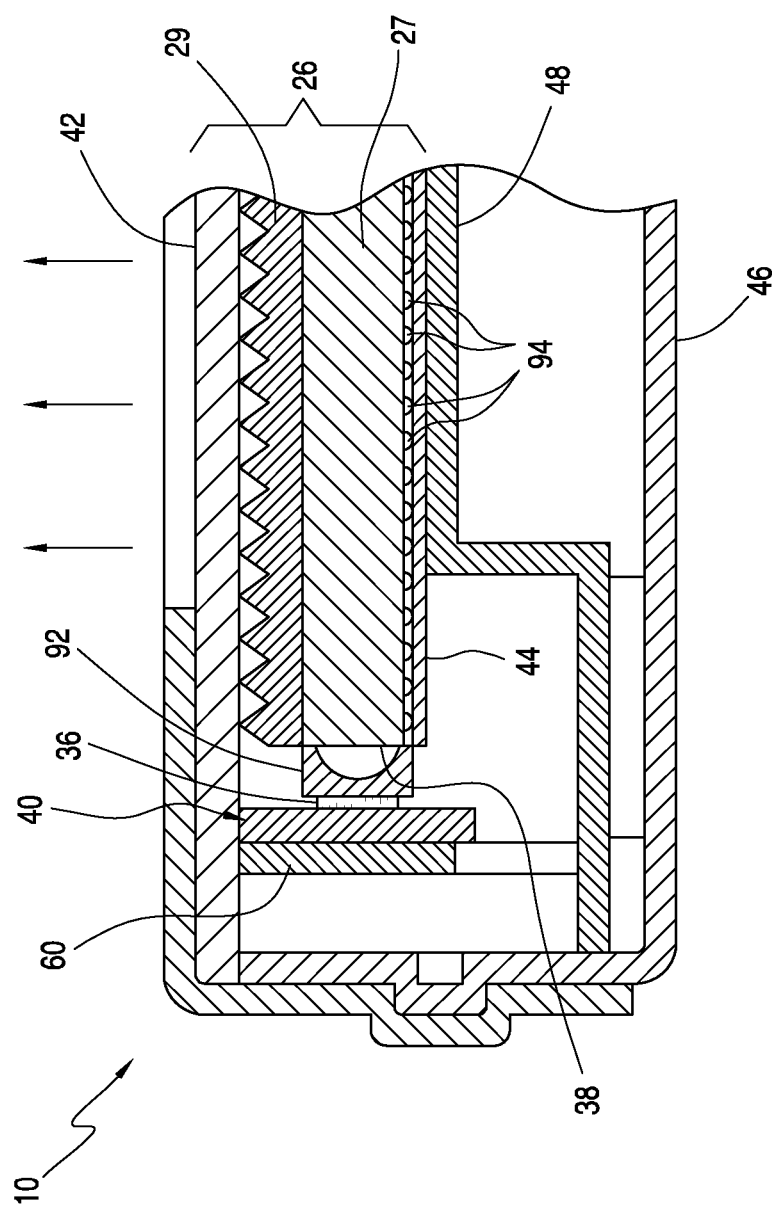
FIG. 5 is a cross-sectional view of a portion of an embodiment of the light fixture, emphasizing the components of the optically transmissive panel assembly.

The LEDs 36 may be supported as part of an LED panel structure, designated generally as 40, such as one or more array, strip, or bar of LEDs 36. Various forms of LEDs packaging may be employed, including for example surface mounted packages that mount LEDs to a printed circuit board. Surface mounting of LEDs typically dissipates heat efficiently. However, it is understood that other LEDs packaging such as pin mounted LEDs, and Chip-on-Board (COB) LEDs, may be utilized. As seen in FIG. 5, a lens 92 or other suitable structure may provide an optical interface between the LEDs 36 and a light guide plate 27 included in optically transmissive panel assembly 26. As used in the present patent application, the term "set of light emitting diodes" (or "LEDs") optionally includes a lens or other optical interface between the LEDs and the optically transmissive panel assembly 26.

The embodiment of FIGS. 1-5 includes a single set of LEDs 36 disposed on the opposite edge of optically transmissive panel assembly 26 from the driving circuitry 50. Alternatively, the set of LEDs 36 may be located at another edge of optically transmissive panel assembly 26 such as the same edge as the driving circuitry 50. The present method of assembly also encompasses multiple sets of LEDs disposed at more than one edge of the optically transmissive panel assembly.

In the embodiment shown, the optically transmissive panel assembly 26 is substantially flat. The term "substantially flat optically transmissive panel assembly," as used in connection with the description of the various embodiments, is meant to include optically transmissive panel assemblies having a thickness that is substantially less than the length and width of the optically transmissive panel assembly. Advantageously, light fixture 10 has a substantially flat configuration, but may be of slightly non-uniform thickness due to the configuration of the optically transmissive panel assembly 26 or of another part of the light fixture 10 such as frame 16.

The term "optically transmissive panel assembly" encompasses all light-transmissive, reflective, or refractive structures in the light path from the set of light emitting diodes (LEDs)—but not including these LEDs or any lens or other optical interface adjacent the LEDs—to the lighting area 31 (see, e.g., the structures shown at 26 in FIG. 5). In one embodiment the optically transmissive panel assembly includes a light guide plate 27 (LGP) in combination with light-reflective and light-transmissive films, sheeting, or coatings. The optically transmissive panel assembly may include separate component parts assembled during production of base assembly 14, or may comprise a composite structure. In the embodiment of FIG. 2, optically transmissive panel assembly 26 includes light guide plate (LGP) 27, reflective film 44, light patterning film 29 adjacent a surface of the light guide plate 27 opposite reflective film 44, and diffuser plate 42 at the front surface (lighting area 31) of the optically transmissive panel assembly. In an advantageous embodiment, diffuser 42 comprises a plastic sheet that also serves to seal light fixture 10 at its front surface. This diffuser sheet 42 may be covered at its edges by bezel 20.

The bezel 20 of the frame 16 comprises a front cover that covers the first edge channel 32 at the front surface of the light fixture 10. The front cover or bezel 20 has a width greater than or equal to the width of the first edge channel. The frame 16 includes a floor 46 disposed at its bottom. Floor 46 includes or supports a platform 48 for the reflective film 44 and the other components of optically transmissive panel assembly 26.

Driving circuitry, designated generally as 50, is disposed within the first edge channel 32 and operatively coupled to the set of LEDs 36. In use of the light fixture 10, the driving circuitry 50 is operatively coupled to an AC power supply (not shown) external to the light fixture to power the set of light emitting diodes (LEDs). Power may be provided by a conduit 51 provided access through an opening 53 in the floor 46 of the frame 16.

As can be seen in FIG. 3, an adhesive thermal film such as adhesive tape 52 provides thermal and electrical isolation as well as spacing of the bottom of the driving circuitry relative to the floor 46 of the frame 16. Other strips of adhesive tape 54, 56 provide similar features. A metal enclosure 58 isolates driving circuitry 50. A second inner wall 60 extends from the platform 48. The second inner wall 60 supports the LEDs strip 36 and serves to dissipate the heat thereof. A second edge channel 62 is thus defined between the second edge wall and the second inner wall. The second edge channel 62 may be used to provide access to other components of the light fixture 10. Additional edge channels at other sides of light fixture 10 can be provided in a similar manner.

Turning now to FIG. 5, this view provides an enlarged sectional view of the portion of the light fixture 10 including the optically transmissive panel assembly 26. The light guide plate or LGP 27 is designed to receive light at an edge surface of LGP 27 from an array of light emitting diodes (LEDs), one of which is shown at 40 in this view along with lens 92. Light guide plate 27 redirects the light in a desired pattern to be projected from a front surface of the plate. The LGP may be comprised of an extremely transparent plastic material such as an acrylic or polycarbonate resin; e.g. LGP 27 may be made from poly(methyl methacrylate) (PMMA) resin. On the bottom of the light guide plate a matrix of lines or microstructures 94 can be formed, dots can be printed, or particulates can be added to the panel polymer. Such techniques may be combined. As discussed below, structures at the bottom of the plate, or particulate additives, act together with a reflector 44 to direct light received by the light guide plate out of the front of the plate.

One manufacturing technique molds or otherwise forms microstructure elements across a bottom face of the light guide plate. Geometrical and optical properties of microstructure elements can be changed independently, using parametric or non-parametric controls. Size, shape, depth, pitch, density and angle of rotation of the microstructures all can be controlled to provide greater uniformity of brightness, or other output luminance distribution. For example, light extraction microstructures may be pyramidal, hemispherical, or semiellipsoid, among other forms.

In V-cutting, a V-shaped blade creates a grid on the bottom of the panel by etching a series of vertical and horizontal lines. The depth and spacing of these lines is chosen to optimize the evenness and brightness of light released from the panel. Commonly, in order to achieve uniform brightness, vertical V-grooves are widely spaced when they are close to the light source, but narrowly spaced when they are farther away from the light source. Horizontal V-grooves gradually grow wider and deeper as their distance from the light source increases. These V-groove arrangements provide markedly improved uniformity of brightness at the front surface of the LGP.

In printed-dot light guide plates, a matrix of fine dots is printed onto the LGP using diffusive ink. These dots help scatter the light emitted from the light source. Dot printing is a quicker and cheaper process than molded microstructures or V-cutting, but the printed ink dots are less effective at refracting light and therefore not as bright. Yet another method is to add particulates to the resin itself. These minute particles are scattered throughout the panel and reflect light in all directions when combined with a light source. Similarly to dot printing, the particulates do not reflect as much light out of the front of the panel as V-cutting or microstructures. Other techniques for forming light extraction structures in light guide plates include chemical-etching and laser-etching.

The light guide plate may include reflective surfaces (e.g. coatings) at other side surfaces besides the surface that receives light from the light guide plate 27, to reflect light incident on these surfaces back into the light guide plate 27. As seen in FIG. 5, a reflective film or reflector 44 may be provided below the bottom surface of the light guide plate 27 to reflect light that is refracted out of the bottom surface back through the light guide plate 27.

The LED panel fixture may include light-transmissive sheeting or film that receives light from a front surface of the light guide plate and transmits light from the emission area of the light fixture. The light-transmissive sheeting or film can be rigid or flexible, and may include a single layer or multiple layers of translucent material. The light-transmissive sheeting or film can include a diffuser, which scatters the light received from the light guide plate. Instead of or in addition to the diffuser, the light-transmissive sheeting or film can be configured to modify or otherwise direct the distribution of light received from the reflection panel in a variety of ways (also herein called "patterning film"; as used herein, this term encompasses thin flexible films as well as rigid and semi-rigid sheeting). The light-transmissive sheeting or films embodiment of FIG. 5 includes both a patterning film 29 adjacent light guide plate 27, and diffuser sheet 42 comprising the outer (front) surface of the optically transmissive panel assembly 26.

Patterning film may be used to provide controlled directionality of light output from the optically transmissive panel assembly. The light output is generally a cone of light wherein candlepower intensity is the greatest at the center of the cone and diminishes toward the edge of the cone. The term "beam angle" signifies the angle at which the beam candlepower falls to 50% of the candlepower at the angle of peak luminous intensity (usually the latter is the center beam angle). Lamp type terms such as "spot" and "flood" have been adapted to LED lamps. For example, ENERGY STAR® Program Requirements for Integral LED Lamps provide that for LED lamps falling within the guidelines, suppliers are required to state the beam distribution in terms of Spot, Narrow Flood, or Flood, based upon the following definitions: "Spot" for 10°-20° beam angle; "Narrow flood" for 20°-30° beam angle; and "Flood" for greater than 30° beam angle. The use of patterning films and other patterning optics to provide narrowed beam angles and other desired light outputs of LED panel light fixtures is disclosed in U.S. patent application Ser. No. 14/246,823, "LIGHTING ASSEMBLY".

In summary, the light guide plate 27 receives light from a LED light source 40 including LEDs 36. Light guide plate 27 includes the plurality of microstructures 94 disposed on its bottom surface. Light beams emitted from LEDs 36 enter the light guide plate 27 at the edge surface 38 of the LGP. Then, by means of the microstructures 94 which disrupt the total reflection, a portion of the light beams is reflected upward to leave the light guide plate 27 from the front surface of the light guide plate 27. The remaining portion of the light beams leaves the light guide plate from the back surface of the light guide plate and is reflected upwardly by the reflector 44 to enter into the light guide plate 27 again, and then exit the LGP 27 from its front surface.

Assembling LED Panel Light Fixture with Insertion of Component

Figure 7:
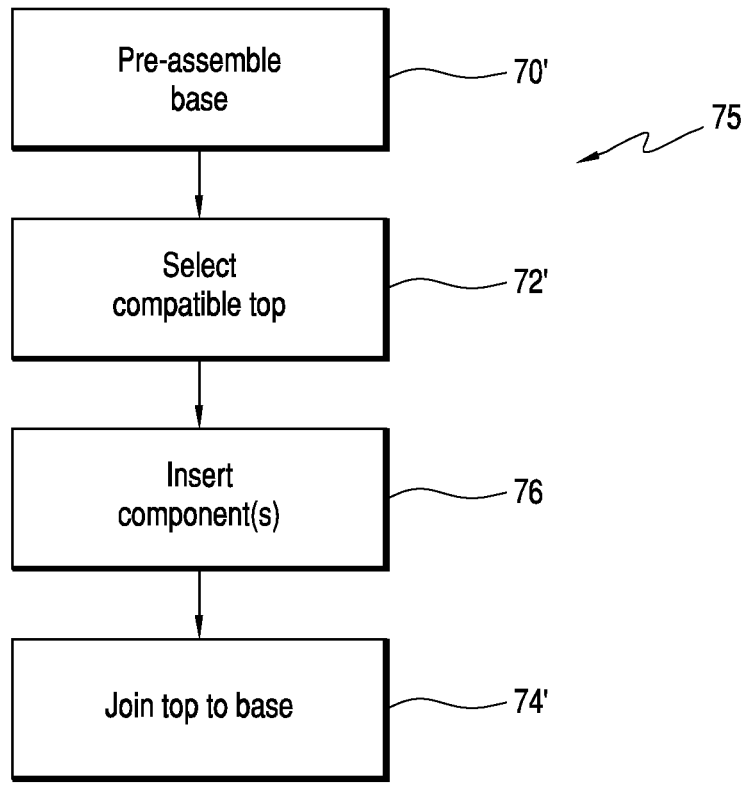
FIG. 7 is a flowchart schematic diagram of a light fixture assembly method in accordance with another aspect of the invention.

In the embodiment of FIGS. 1-5 and the assembly method 69 of FIG. 6, base 14 is pre-assembled with all components of light fixture 10 except the top 12. FIG. 7 shows an alternative method of assembly 75 in which the final assembly of light fixture 10 includes at least one additional component besides the components of base assembly 14, and of top assembly 12. Steps 70' (Pre-Assemble Base), 72' (Select Compatible Top), and 74' (Join Top to Base) are essentially the same as the corresponding steps 70, 72, and 74 of the basic assembly method of FIG. 6. The method of FIG. 7 includes an additional step 76, Insert Component(s), in which one or more component is inserted into or onto the base assembly 14 prior to joining the top to base. Step 76 may involve inserting one or more additional component, or may involve removing a component(s) from base 14 and inserting a new component in place of the component(s) removed.

In the assembly process 75 of FIG. 7, generally the component is inserted in an open area of the base frame. For example, an optical film component(s) may be inserted onto the top surface of the base assembly 14 (cf. FIG. 9, insertion of components 25 onto base 14 prior to joining top 12; and FIG. 12, insertion of patterning film component 98). Alternatively, a component may be inserted at an edge surface of the base through an open area or access port of the base frame (cf. FIG. 11, insertion of LEDs strip component 88 through opening 86 at one end of the base frame).

Figure 9:
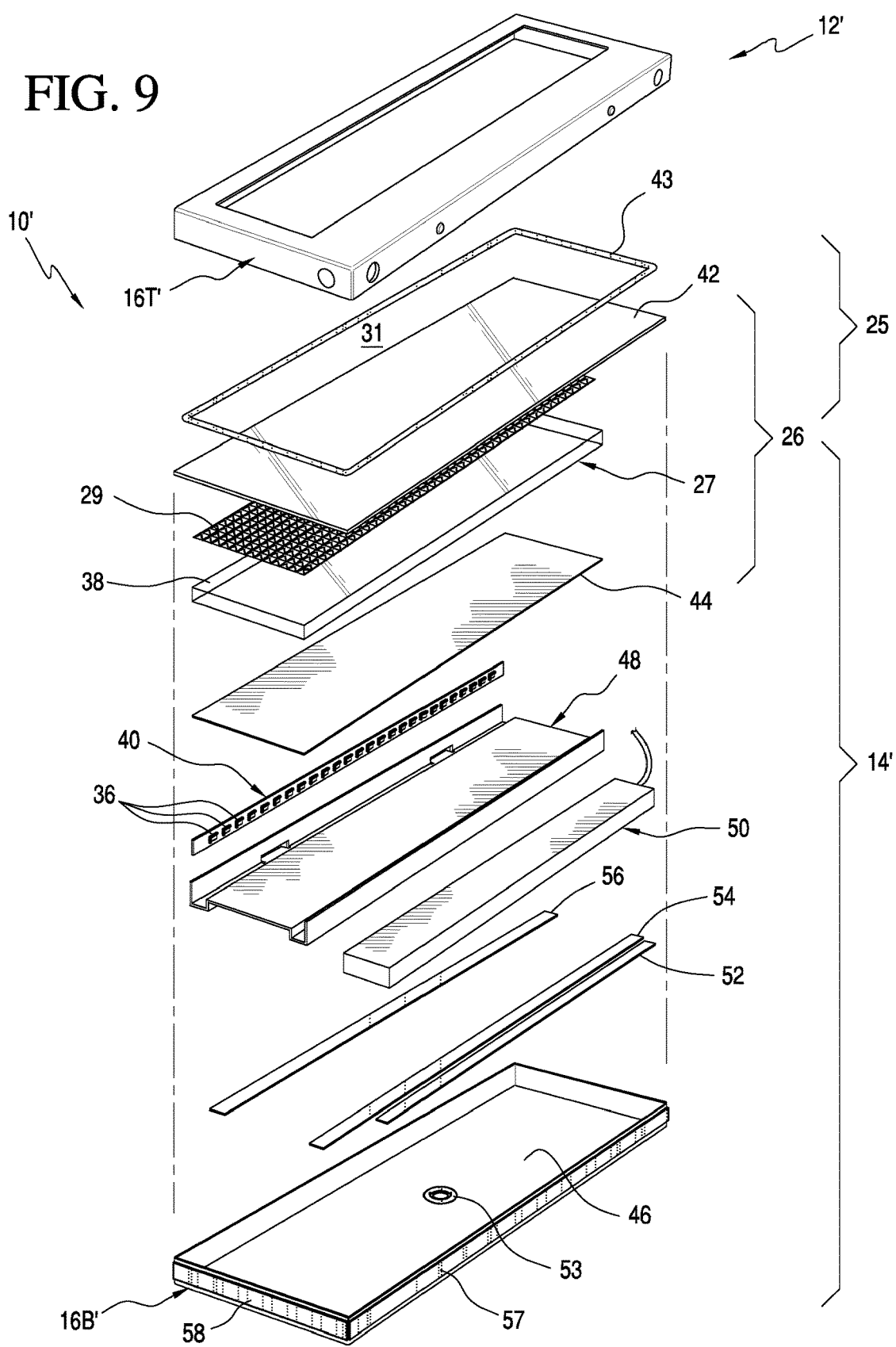
FIG. 9 is an exploded perspective view of an alternative light fixture embodiment.

FIG. 9 shows an alternative embodiment of LED light fixture 10' assembled in accordance with the present disclosure, which is designed for a high IP (ingress protection) rating. In the widely recognized standard of the International Electrotechnical Commission (IEC 60598-1:2003), the first digit of the rating system represents the level of protection from ingress of solid objects (0-6), and the second digit represents protection from ingress of liquids (0-8). For example, an LED panel light fixture with an IP rating of 54 (IP54) represents Dust Protected (dust does not enter in sufficient quantity to interfere with satisfactory operation), and Protected against Splashing Water (water splashing against the fixture from any direction has no harmful effect). An LED panel light fixture with an IP rating of 65 (IP65) represents Dust Tight (no ingress of dust) and Protected against Water Jets (water projected by a nozzle against enclosure from any direction has no harmful effects).

The fixture of FIG. 9 includes top frame 16T' and base frame 16B' that, in comparison to the fixture of FIG. 2, eliminates various wiring access openings in the top frame and base frame, and omits perforations at the floor 46 of the base frame. Base frame 16B' includes a water-tight compression fitting 53 at the center of the floor 46, at which the AC power cable is routed into the base. Edge walls of the base frame 16B' include bands 57, 58 that form a high-rating IP seal when joining top 12' to base assembly 14'. In accordance with the method of assembly 75 of FIG. 7, patterning film 29, diffuser sheet 42, and gasket material 43 are components 25 inserted on top of the base 14' prior to joining the top to the base. Diffuser 42 is a plastic sheet or film. A liquid (gel) silicone 43 is deposited at the periphery of diffuser 42. During final assembly the top 12' is pressed down on the upper face of the base 14' with components 25, causing the silicone 43 to form a gasket. In addition, pressing top frame 16T' onto base frame 16B' causes sealing bands 57, 58 to form a water-tight gasket or seal between inner and outer edge walls of the frame 16T', 16B'. Sealing bands 57, 58 may comprise a non-adhesive liquid silicone forming a removable, non-adhesive seal between base frame 16B' and top frame 16T', or may comprise a permanent hydrophobic adhesive that forms a non-removable adhesive seal between base frame 16B' and top frame 16T'.

Figure 10:
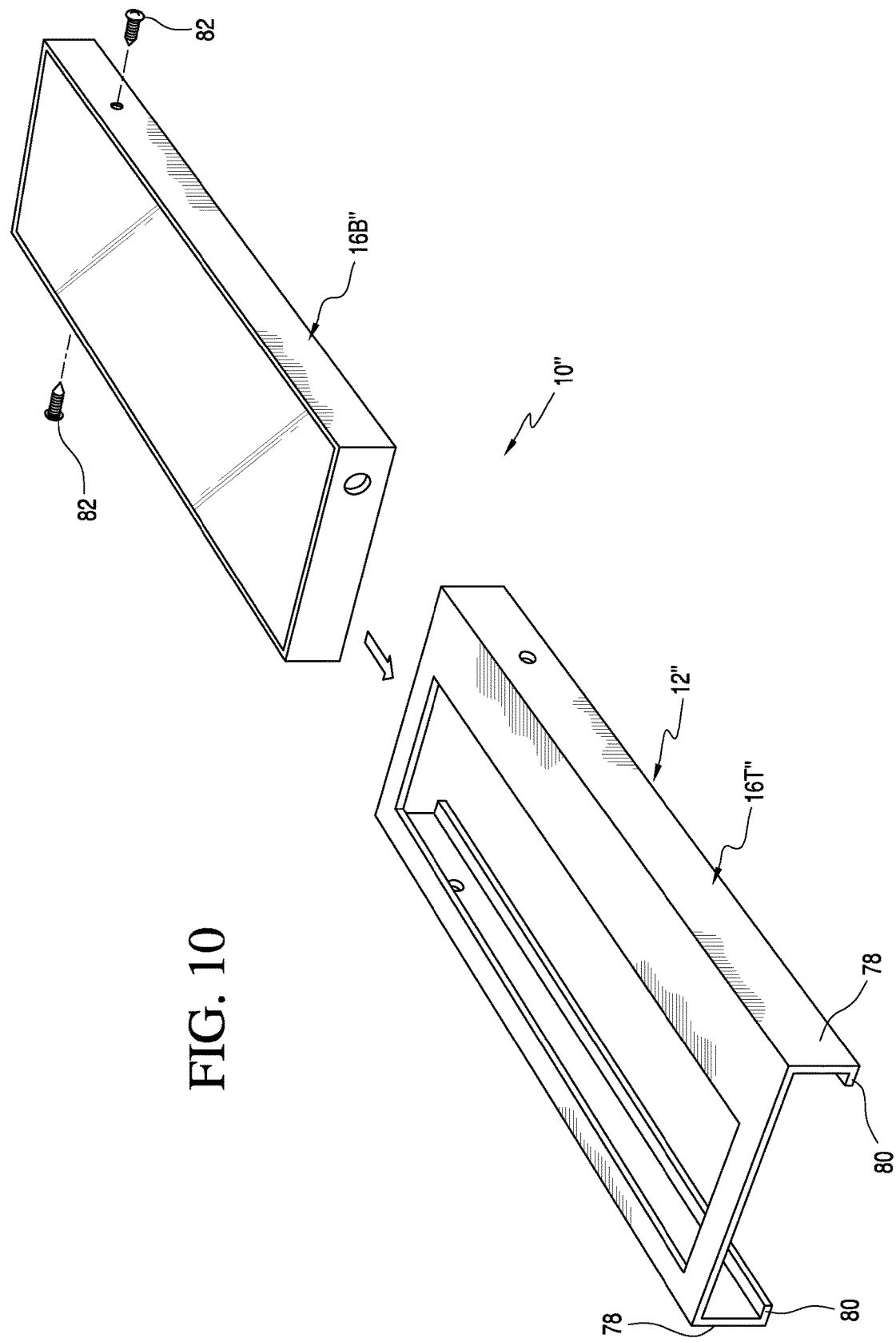
FIG. 10 is a perspective view of a base assembly and top prior to joining in accordance with an alternative embodiment of the disclosed assembly method.
Figure 11:
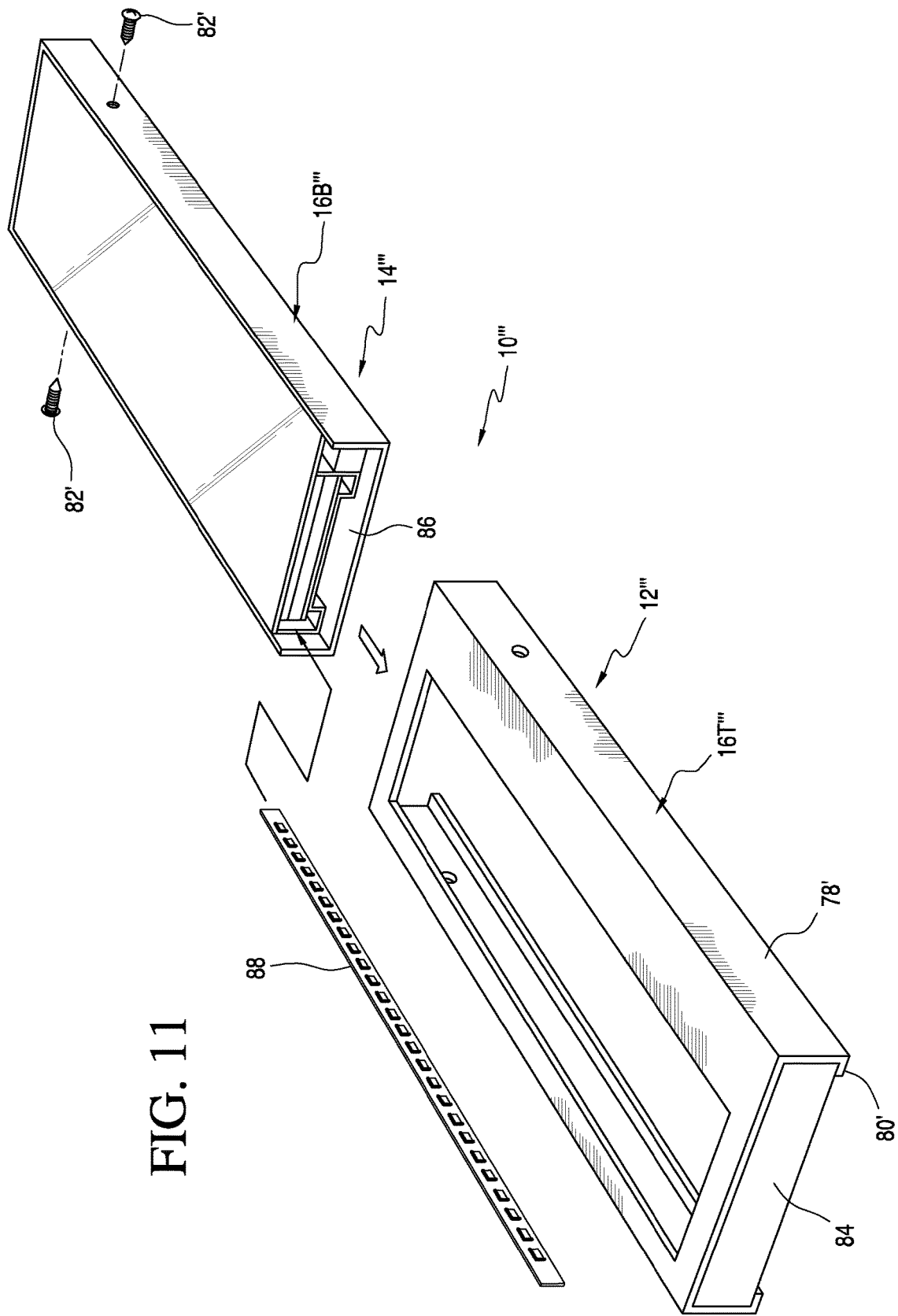
FIG. 11 is a perspective view of a base assembly and top prior to joining in accordance with a further alternative embodiment of the disclosed assembly method.
Figure 12:
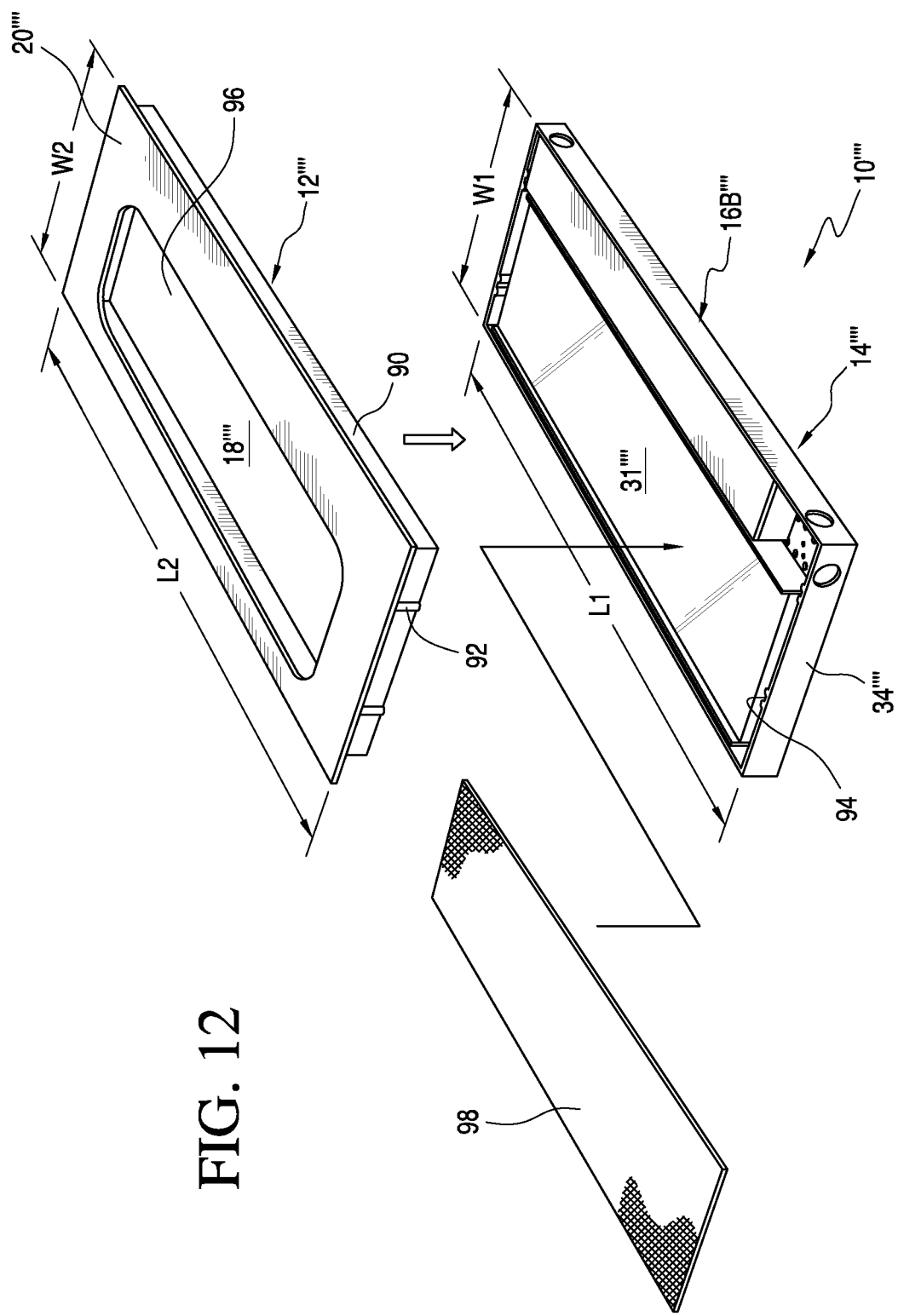
FIG. 12 is a perspective view of a base assembly and top prior to joining in accordance with yet another embodiment of the disclosed assembly method.

FIGS. 10-12 illustrate alternative LED light fixture embodiments assembled in accordance with the present method, in each case showing the base assembly and top positioned adjacent each other prior to joining these parts together. FIGS. 10 and 11 show alternative LED panel light fixture embodiments with configurations of the top assembly (12" and 12''') that utilize an alternative principle for joining top to base. In the embodiments of FIGS. 1-5 and FIG. 8, the top frame is configured to be pressed downwardly around the base frame (FIG. 4), and these parts are joined using an engineering fit. In the embodiment of FIG. 10, the top frame 16T" is slid lengthwise into alignment with the base frame 16B". The top and base frames may include structures (not shown) that register when the parts are aligned. Top frame 16T" includes edge walls 78 that slidingly engage the base frame 16B" at side walls and inward-returning flanges 80 that engage edge portions of the bottom of the base frame 16B". For example, flanges 80 may be rolled, finished metal flanges. When top frame 16T" and base frame 16B" are aligned, top and base are secured using fasteners 82 inserted in apertures in the side walls of top frame and base frame.

In FIG. 10, base frame 16B" has edge walls at both short edges, while top frame 16T" includes no edge walls at its short edges, i.e. it is open at both ends. In the final assembled frame, the long edges include a double-layer edge wall while the short edges include a single-layer edge wall provided by the base frame 16B". In the embodiment of FIG. 11, top frame 16T''' includes no edge wall as its far end, but has an edge wall 84 at its near end. Base frame 16B''' has an edge wall at one short edge and is open at the other (nearer) short edge 86. Prior to joining top to base, internal structures of base 14''' are accessible at the open edge wall, and a component can be inserted in the base through this open edge 86. For example, LED bar 88 may be inserted through open edge 86, optionally after removing another LED bar (not shown) from the pre-assembled base. Top frame 16T''' includes edge walls 78' with flanges 78", and top and base are slidingly engaged, then secured with fasteners 82' as described above for FIG. 10. Similar to FIG. 10, in the final assembled frame in the embodiment of FIG. 10, the long edges include a double-layer edge wall while each of the short edges includes a single-layer edge wall, respectively provided by the base frame 16B''' and top frame 16T'''.

In the LED panel light fixture of FIG. 10, the base and top are removably joined via engineering fit and fasteners 82'. During the useful life of the LED panel light fixture 10''', a user or technician can service the fixture by removing fasteners 82', slidingly separating the top from base, and (for example) exchanging a new component for a spent or failed component, such as driving circuitry, that was installed during original assembly.

The LED panel light fixture 10"" shown in FIG. 12 (prior to final assembly) embodies another mechanism for joining base to top, and illustrates variations in base and top form factor. The top 12"" includes a downwardly extending rectangular flange 90 that fits within the base frame 16B"" rather than outside the base frame as in the prior embodiments. The flange 90 is configured to fit snugly against the uppermost portion of the edge walls 34"" of the base frame 16B"". The top flange and the base frame inner walls have facing surfaces, which may be joined using an engineering fit, and/or may include a mechanism for permanently or removably joining the top frame and base frame at these facing surfaces. For example, the flange 90 may include pins 92 that mate with tracks 94 in the base frame edge walls. The LED panel light fixture 10"" may incorporate metal-composite materials in the top 12"". For example, the front surface of top 12"" can be a durable plastic layer over a metal sheet, and the flange 92 can be metallic.

In the base and top form factor of FIG. 12, the top 12"" extends somewhat beyond the base 14"" both along the length and width of the lighting fixture. That is, L2 is somewhat greater than L1, and W2 is somewhat greater than W1. This is an example in which a compatible top and base (cf. FIG. 6) do not have matching sizes or dimensions. This configuration of top and base can be useful, for example, in recessed mounting applications in which the base 14"" fits within a recess (e.g. in wall or ceiling), and in which lower edge surfaces of the top 12"" extending beyond the base can be mounted adjacent outer edges of the recess.

The LED panel light fixture 10"" of FIG. 12 also illustrates the feature of an emission area 18"" (of opening 96 within the bezel 20"") that has a rounded shape with an aperture that is smaller than the substantially rectangular lighting area 31"". Additionally, FIG. 12 illustrates the optional assembly step of inserting a component—optical film 98—on top of the base 14"" prior to joining top 12"" to base 14"". (Compare FIG. 11, in which the component is inserted at an edge of the base.)

Assembling LED Panel Fixture from Base and Top During Installation

In the assembly method 69 of FIG. 6 and assembly method 75 of FIG. 7, the LED panel light fixture is fully assembled prior to installation by a user. The embodiments of FIGS. 1-5 and FIGS. 9-12 all are designed for installation of a fully assembled LED light fixture. By contrast, in the assembly method 79 of FIG. 8, the final step 74"—join top to base—occurs during installation of the light fixture by a user rather than as a step in the manufacture of the lighting fixture. Step 70" (Pre-Assemble Base) is essentially the same as the corresponding step 70 of the basic assembly method of FIG. 6. Step 72" (Select Compatible Top) is similar to the corresponding step 72 of the basic assembly method of FIG. 6, but rather than joining the selected top to the base during manufacture, the pre-assembled base and selected top are provided to user as separate parts, for example as a kit to be installed by the user. In an initial installation step 76', only the base is installed, followed by the step 74" of joining the top to the installed base. For example, as illustrated below in the embodiments of FIGS. 13-16, the base and top can be supplied to the user as separate parts of a kit, for installation of the base followed by joining the top to the base to complete installation. In summary, steps 70" and 72" advantageously are carried out by a manufacturer of the base and top to be assembled as an LED panel light fixture, while steps 76' and 74" are carried out by a user.

Figure 13:
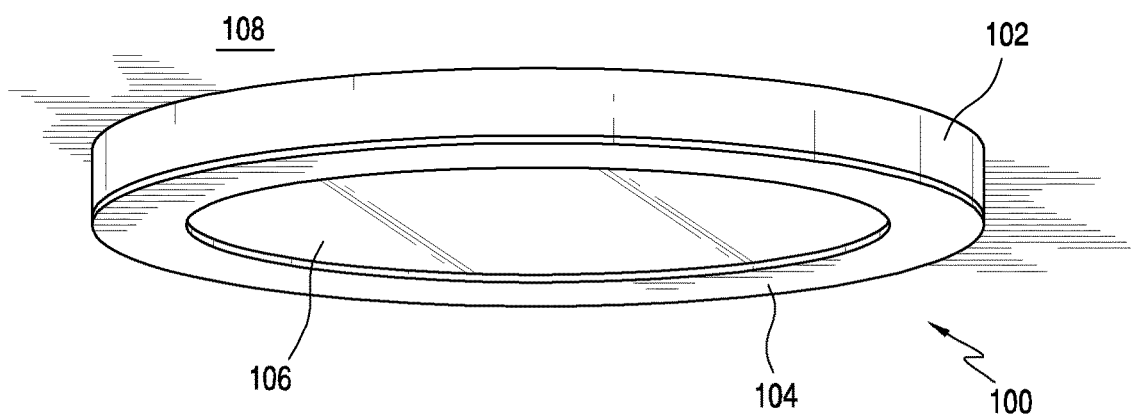
FIG. 13 is a perspective illustration of a further embodiment of LED light fixture in accordance with the present invention.
Figure 14:
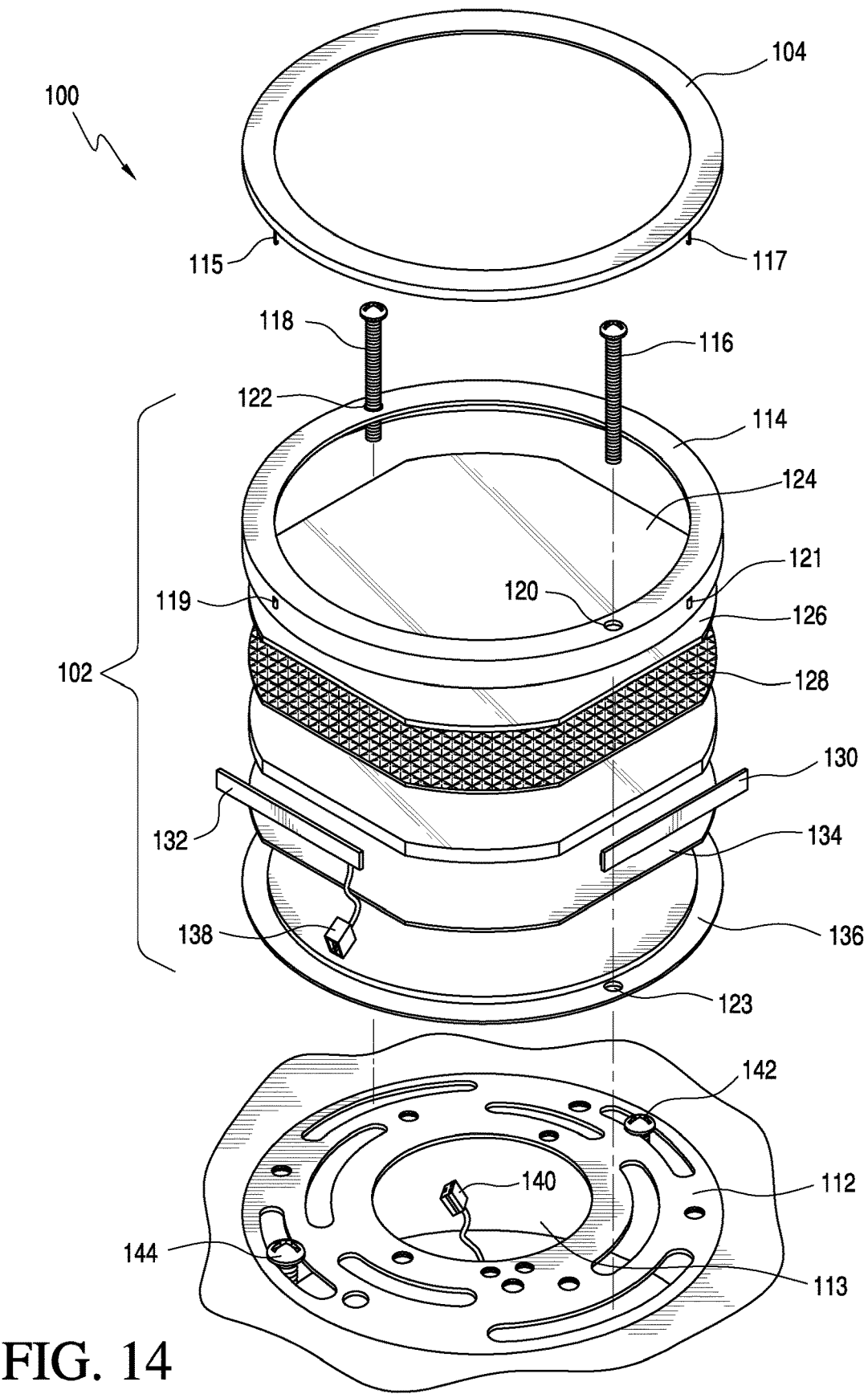
FIG. 14 is an exploded perspective view of the light fixture of FIG. 13, during installation in a surface mounting application.

FIGS. 13 and 14 show a light fixture 100 designed for surface mounting to a ceiling 108 or other surface. Light fixture 100 includes a cylindrical base 102 covered by an annular top 104. Top 104 surrounds a substantially circular light emission area 106. In FIG. 14 the components of base 102 are shown in an exploded view, but in practice at the time of installation the components of base 102 have been pre-assembled. During installation, the user first installs the base 102 to the universal cross bar 112 that covers a ceiling box 113, then joins the top 104 to the base. The upper surface of the base 102 is uncovered by the top during the initial stage of installation, allowing the user to insert mounting bolts 116, 118 respectively through vias 120, 122 in the base 102 to attach the base to universal cross bar 112. Then the user affixes top 104 to upper cover 114 of base 102, for example using flexible mounting hooks 115, 117 that engage catches 119, 121 in upper cover 114. Other joining methods for top 104 and base 102, such as twist-lock mechanisms, may be employed. Upper cover 104 may comprise a plain metal as it is not intended to serve as the ultimate upper surface of light fixture 100, while top 104 may be selected from a variety of ornamental materials, finishes, and physical configurations. The light fixture 100 of FIGS. 13 and 14, may embody other form factors, such as square and rectangular configurations, without departing from the method of assembly and arrangement of components described here.

Components of base 102 seen in the exploded view of FIG. 14 include bottom cover 136 and upper cover 114, enclosing various functional components of light fixture 100. An optically transmissive panel assembly includes light guide plate 128, reflector 134, patterning film 126, and diffuser 124. The optically transmissive panel assembly received light from LEDs strip 130, which is driven by a power circuit board 132 that converts an AC power input to DC output. These components 130, 132 are housed in a channel defined between the bottom cover 136 and upper cover 114 and the periphery of the optically transmissive panel assembly. The optically transmissive panel assembly may include indentations to provide additional space for LEDs strip 130 and/or power circuit board 132.

During installation of the base 102, the user connects power connector 138 (preferably a male-configuration electrical connector, coupled to power circuit board 132) to source power connector 140. Source power connector 140, which preferably is a female-configuration electrical connector, extends from ceiling box 113 where it is coupled to an AC power supply (not shown). As well known in the art, universal cross bar 112 is disk-shaped and is perforated with holes and slots that are arranged to accommodate several types of electrical boxes. Universal cross bar 112 is secured to ceiling box 113 using bolts 142, 144.

Figure 8:
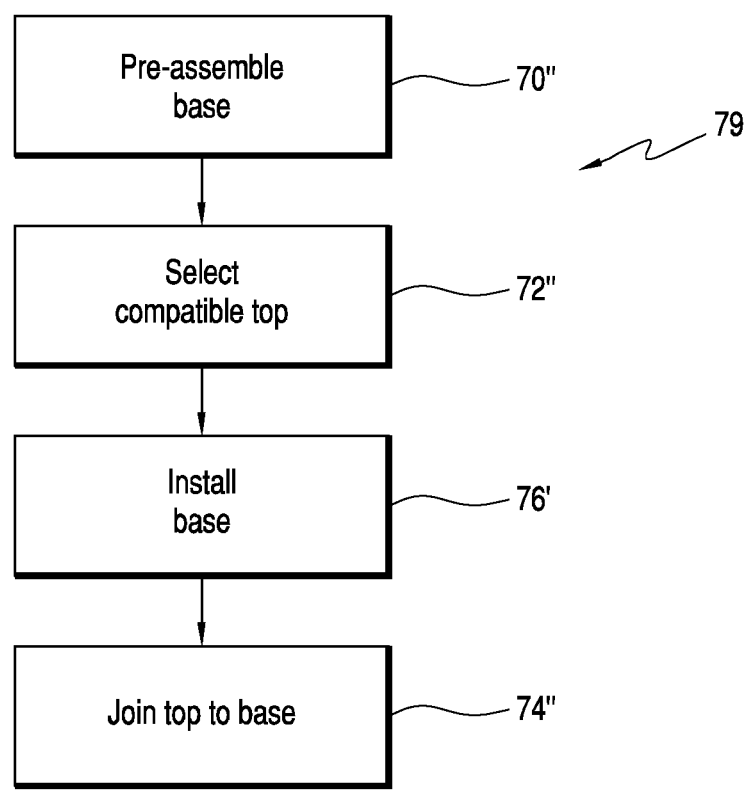
FIG. 8 is a flowchart schematic diagram of a light fixture assembly method in accordance with another aspect of the invention.
Figure 15:
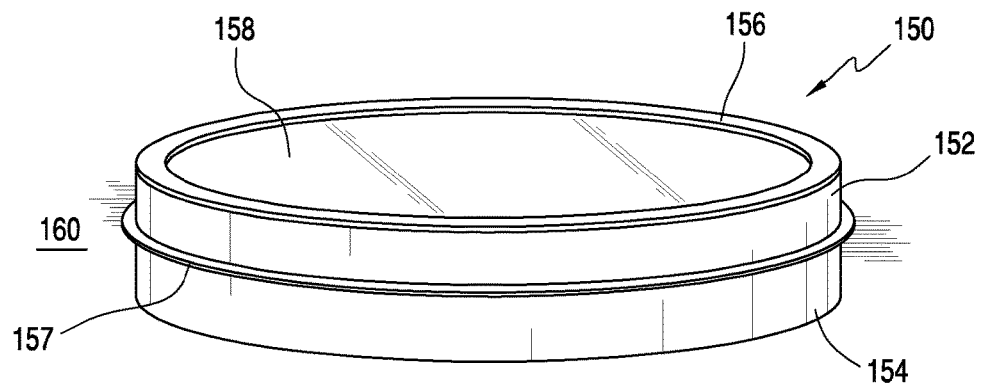
FIG. 15 is a perspective illustration of still another embodiment of LED light fixture in accordance with the present invention.
Figure 16:
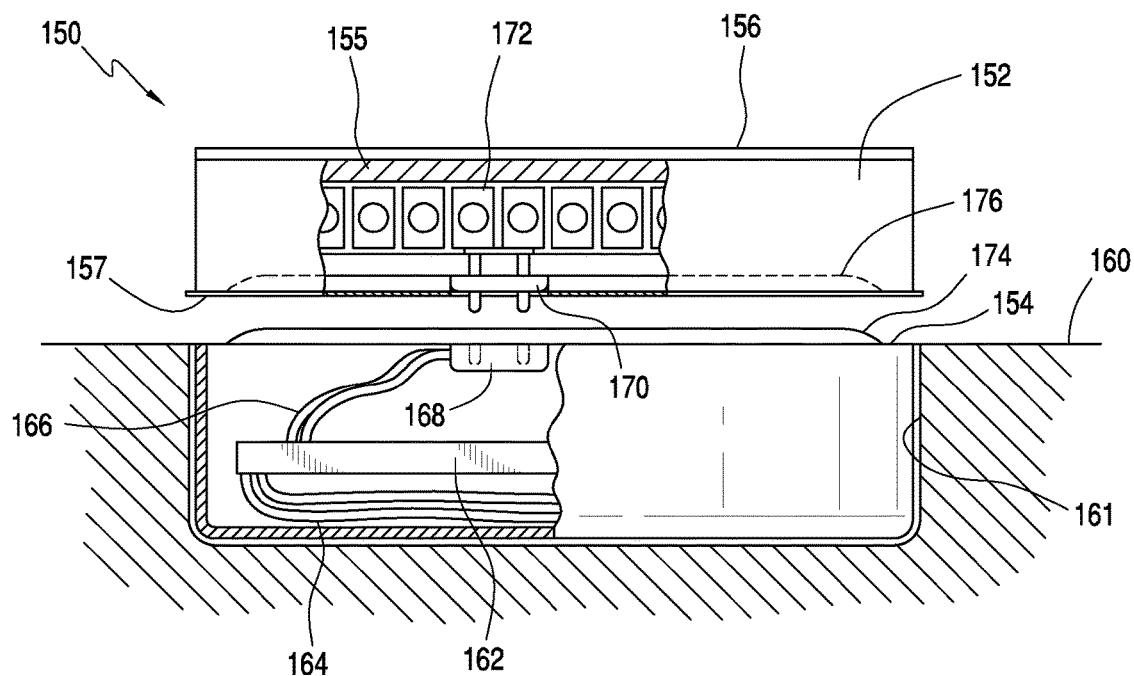
FIG. 16 is a cross sectional view of the light fixture of FIG. 15, during installation in a recess mounting application.

FIGS. 15 and 16 show a further light fixture embodiment that is designed to be assembled using the assembly method 75 of FIG. 8. As installed (FIG. 15), light fixture 150 incorporates circular cylindrical base 154 and top 152. Top 152 includes at its front surface a thin annular bezel 156 surrounding substantially circular emission area 158. Light fixture is designed for recess mounting at mounting surface 160 wherein the base 154 is recessed below the surface, and the top 152 extends above the surface. A trim ring 157 is located at the lower circumference of top 152 to cover the mounting surface 160 adjacent light fixture 150.

Light fixture 150 exemplifies a base plus top configuration of LED panel light fixture according to the present disclosure, wherein the top incorporates a substantial portion of the functional optical and electrical components of the light fixture. Interior components of top 152 include a substantially cylindrical light guide plate 155 and LEDs strip 172 at the periphery (edge channel) of the light guide plate. Because the driver electronics are located in base 154, the volume requirements of LEDs 172 are less than (for example) the round fixture 100 of FIG. 14, and this permits reducing the width of the edge channel and of the bezel 156 (as seen in FIG. 15). That is, the LEDs strip 172 is located in a narrow edge channel at the periphery of the optically transmissive panel assembly, while the top 152 includes a narrow bezel 158 surrounding the light-emitting area 158. LEDs 172 are coupled to driver electrical connector, which may be a fixed electrical connector mounted at the lower surface of top 152.

Base 154 incorporates power circuit board 162, which covers AC input power to DC output, and associated electrical conductors. AC power line 164 connects power circuit board to an external AC power source (not shown in this highly schematic view). DC power lines couple power circuit 162 to a DC power connector, which is shown as a fixed electrical connector at the upper surface of base 154. Other fixed and mobile electrical connectors or contacts may be employed.

During installation of the light fixture 150, the user first installs the base 154 in a recess 161 below mounting surface 160, using a recess mounting mechanism. A variety of mounting hardware, such as brackets, flanges, and mounting straps, are known in the art and will depend on the recess mounting layout. During this initial installation step, the top 152 is not yet joined to base 154 in order to permit the user ready access to the recess mounting mechanism. Then the user lowers top 152 onto base 154, joining these parts at mating surfaces including base mounting flange 174 and top mounting flange 176. During this joining step, DC power connector is coupled to LEDs driver connector 170. A variety of joining methods, using interference fit and/or mechanical fastening, may be employed in the light fixture of FIG. 16, including locking mechanisms such as twist-lock mechanisms. In addition, during this joining step the trim ring 157 at the lower circumference of top 152 seals the recess 161 (i.e. gap between base 154 and mounting surface 160) and covers the mounting surface 160 adjacent light fixture 150.

In both the lighting fixture 100 of FIGS. 13 and 14, and the lighting fixture 150 of FIGS. 15 and 16, the base includes a mounting mechanism (surface mounting mechanism in FIG. 14 and recess mounting mechanism in FIG. 16) that is only accessible before joining the top to the base. During the initial installation step (step 76' in the assembly method of FIG. 8), the user installs the pre-assembled base using the mounting mechanism. The top includes a joining mechanism for joining the top to the base in the second installation step (step 74" in FIG. 8).

Method of Specifying LED Panel Light Fixture

The method of assembly of LED light fixtures of the present disclosure relies upon the LED panel light fixture including, prior to final assembly, a base and a top, and optionally separate components. The instant disclosure also encompasses a method of specifying an LED panel light fixture using base specifications, top specifications, and component specifications. A fixture/base specification is generally a form factor of the entire LED panel light fixture, or in some cases a form factor of the base assembly. A component specification is a requirement of a key functional component of the LED panel light fixture, i.e. the LEDs array, the optically transmissive panel assembly, and the driving circuitry. A top specification is generally a visual feature of the top assembly.

Tables A and B, below, exemplify lists of fixture/base specifications, top specifications, and component specifications within a set or catalog of LED panel light fixtures. Table A lists these specifications within a set of specification categories and sub-categories. Fixture/base specifications represent form factors of the fully assembled light fixture, or in some cases form factors of the base assembly. (As noted above, form factor can refer to the size, style, shape, and visible features of the LED panel light fixture, and of the base and the top. A form factor of the LED panel light fixture can include a form factor of an accessory that is used in mounting or installing the LED panel light fixture). Subcategories within fixture/base specifications include size, base configuration, and accessories. Referring to Table A, a list of specifications under size includes length and width dimensions for rectangular or square form factors—typically representing the size of the LED panel light fixture. However, in some cases the size is that of the base, and the top has a different size (cf. FIG. 11). For other form factors, such as round or elliptical shapes, size dimension(s) appropriate to the shape would be specified, such as diameter of a round LED panel light fixture, as seen in Table A.

Specifications in the second subcategory of fixture/base specifications, base configuration, relate to the physical structure of the lighting fixture or in some cases of the base assembly. Examples of base configuration specifications include mounting techniques such as surface mount and pendant mount (see U.S. Pat. Pub. No. 20130044512, entitled "FLAT PANEL LIGHTING DEVICE AND RETROFIT KIT," for these mounting techniques). Another mounting technique is recessed mount (see the discussion of FIG. 11 of the present patent application). Base configuration specifications also include ingress protection ratings such as IP 54 and IP 67; see the discussion of FIG. 8 of the present application. IP 54 ingress protection might be used for example in a vanity mirror lights, as disclosed in U.S. Patent Application No. 61/812,973, "LIGHTING ASSEMBLY" (cf. FIG. 9); while IP 67 might be used in LED panel light fixtures for shower-light installations.

Further, base configuration specifications include master module and slave module. Master module signifies an LED panel light fixture that has an AC-DC power supply configured to drive both LED array of that lighting fixture as well as one or more slave module. The slave module includes no internal driver circuit, but is driven by DC power from the master module, as discussed in U.S. Patent Application No. 61/812,973, "LIGHTING ASSEMBLY." (See also the specification master-slave driver, in the component specifications for driving circuitry below.) Finally, the exemplary base configuration specifications include "serviceable" and "non-serviceable," signifying respectively that the joining of top to base is removable for servicing, or is not removable, as discussed above.

The third subcategory under fixture/base specifications, accessories, relates to hardware that is mounted or installed with the LED panel light fixture. Examples include a mounting plate used in surface mounting, and a hanging kit used in pendant mounting. (See U.S. Pat. Pub. No. 20130044512, entitled "FLAT PANEL LIGHTING DEVICE AND RETROFIT KIT," for discussion of these mounting hardware.)

In the next major category of specifications, component specifications, subcategories include specifications relating to the LED array, optically transmissive panel assembly, and driving circuitry. The exemplary LED Array specifications include various color temperatures: Warm White—2700K; Neutral—3000K; Bright White—4000K; and Daylight—6500K; as well as various luminous flux values: 1100 lumens, 2500 lumens, and 4300 lumens. Optically transmissive panel assembly specifications include diffusing optics (non-directional light output) as well as various beam angles and peak angles, as discussed above and as disclosed in U.S. Patent Application No. 61/812,973, "LIGHTING ASSEMBLY." Driving circuitry specifications include for example input power (90–130$V_{AC}$, typical in U.S. residences; 220–277$V_{AC}$, typical in U.S. commercial installations; and "universal power supply" specification 100–277$V_{AC}$). Driving circuitry specifications also include advanced driver features such as dimming or no dimming; and an alternating, A-B-A-B driver scheme for extended service life disclosed in U.S. Pat. Pub. No. 2012032062, entitled "FLAT PANEL LIGHTING DEVICE AND DRIVING CIRCUITRY." Driving circuitry specifications also include master-slave drivers, referring to the daisy chain drive systems discussed above (with reference to the specifications for master module and slave module), and in U.S. Patent Application No. 61/812,973, "LIGHTING ASSEMBLY."

The final major category of specifications, top specifications, generally relates to a visual feature of the top assembly and includes subcategories bezel configuration and finish. Bezel configuration specifications relate to the physical structure of the bezel 20. Examples include a beveled edge or flat edge of the bezel; inclusion of a switch or no switch at the bezel; and recess mount bezel (see the discussion of FIG. 11, above). Examples of finish specifications include gloss white, gloss yellow, gloss orange, gloss green, oil-rubbed bronze, satin nickel, and unfinished metal. Myriad other finishes are possible, such as patterned finishes.

In LED panel light fixture designs in which the top includes functional components, such as the light fixture 150 of FIG. 16, the top specifications also can include specifications relating to the functional components included in the top.

Table B shows examples of fixture/base specifications, top specifications, and component specifications, organized by specifications that respectively relate to four product families. Referring to the left-hand column of Table B, Product family 1 includes general purpose, surface mountable and pendant mountable LED panel light fixtures, as disclosed in U.S. Pat. Pub. No. 20130044512, entitled "FLAT PANEL LIGHTING DEVICE AND RETROFIT KIT," and U.S. Pat. Pub. No. 2012032062, entitled "FLAT PANEL LIGHTING DEVICE AND DRIVING CIRCUITRY". Product family 2 includes under-cabinet LED panel light fixtures as disclosed in U.S. Patent Application No. 61/812,973, "LIGHTING ASSEMBLY". Product family 3 includes recessed-mounted LED panel light fixtures; see FIG. 11 and the discussion of that figure in this patent application. Product family 4 includes LED panel light fixtures with increased ingress protection (IP) ratings; see FIG. 8 and the discussion of that figure above.

In one application of the method of specifying LED panel light fixtures illustrated in Tables A and B, the specifications are used as parameters of a product catalog. A product catalog system can be designed to select and display sets of base specifications, component specifications, and top specifications appropriate to given product families, as suggested by Table B. Referring to the last column of Table B such a product catalog system can identify product models within a given product family that satisfied selected specifications, e.g. using SKU numbers, here identified by the generic indicia XXXX.

Another application of the method for specifying LED panel light fixtures of the present invention is in manufacturing resources planning (MRP) systems. Fixture/base specifications, component specifications, and top specifications can provide technical data for Item master data; bills of materials (BOMs); inventories and orders (inventory control); and purchasing management. The present method for specifying LED flat panel lighting fixtures can be applied to the above-disclosed method of assembly in which a pre-assembled base is joined to a top, optionally after inserting a component. In this embodiment, specified components in accordance with the component specifications may be included in the pre-assembled base, or may be separate components inserted before joining base to top. The present method for specifying LED flat panel lighting fixtures also can be applied to MRP systems used with other methods of assembly, in which a base assembly is not necessarily pre-assembled. For example, the present method of specifying LED panel light fixtures may be used in conjunction with knock-down manufacture in which components are provided in knock-down kits with the lighting fixture frame and top for assembly of the LED panel light fixture. As used in the present patent application, "knock-down kit" refers to a kit containing parts used to manufacture the LED panel light fixture, wherein components such as the frame and various functional components may be pre-assembled and/or may be assembled during final assembly of the LED panel light fixture from the knock-down kit. "Knock-down manufacture" may or may not involve manufacture of parts of the knock-down kit for export to another country or region for final assembly.

To illustrate aspects of the disclosed technology in a clear and concise manner, the drawings may not necessarily be to scale and certain features may be shown in somewhat schematic form.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

TABLE A

LED LIGHT FIXTURE SPECIFICATIONS BY SPECIFICATION CATEGORY

| | Fixture/Base Specifications Fixture/Base form factors | | | Component Specifications | | | Driving Circuitry | Top Specifications Top Assembly exterior aspect | |
|---|---|---|---|---|---|---|---|---|---|
| | | | | LEDs Array | Optically | | | | |
| | Size | Fixture/Base Configuration | Accessories | Color Temperature, Luminous Flux | Transmissive Panel Assembly Directionality | | Input Power. Advanced Features | Bezel Configuration | Finish |
| | 4 × 4 in. | Surface Mount | Mounting Plate | Warm White - 2700 K | Non-directional | | Input power 90~130 VAC | Beveled Edge | Gloss White |
| | 4 × 12 in. | Pendant Mount | Hanging Kit | Neutral - 3000 k | 20° beam angle | | Input power 220~277 VAC | Flat Edge Switch | Gloss Yellow |
| | 4 × 18 in. | Recessed | | | 45° beam angle | | | | Gloss Orange |
| | 4 × 24 in. | Frame | | Bright White - 4000 K | 60° beam angle | | Input power 100~277 VAC | No Switch Recess mount bezel | Gloss Green |
| | 4 × 36 in. | IP 54 | | | normal peak angle | | | | Oil Rubbed Bronze |
| | 4 × 42 in. | IP 65 | | Daylight - 6500 K | 20° peak angle | | Dimming | | Satin Nickel |
| | 6 × 6 in. | Master module | | | 40° peak angle | | No Dimming | | Unfinished |
| | 8 × 8 in. | Slave module | | 1100 lumens | | | A-B-A-B Driver | | Metal |
| | 1 × 1 ft. | Serviceable | | 2500 lumens | | | Master-Slave Driver | | |
| | 1 × 2 ft. | Non- | | 4300 lumens | | | | | |
| | 1.5 × 4 ft. | serviceable | | | | | | | |
| | 2 × 2 ft. | | | | | | | | |
| | 2 × 4 ft. | | | | | | | | |
| | 4 × 4 ft. | | | | | | | | |
| | 6 in. round | | | | | | | | |
| | 12 in. round | | | | | | | | |

TABLE B

LED LIGHT FIXTURE SPECIFICATIONS BY PRODUCT FAMILY

| Product Family | Fixture/Base Specifications Fixture/Base form factors | | | Component Specifications | | Driving Circuitry | Top Specifications Top Assembly exterior aspect | | |
|---|---|---|---|---|---|---|---|---|---|
| | | | | LEDs Array | Optically | | | | |
| | Size | Fixture/Base Configuration | Accessories | Color Temperature, Luminous Flux | Transmissive Panel Assembly Directionality | Input Power. Advanced Features | Bezel Configuration | Finish | SKU No. |
| 1 | 1 × 1 ft. | Surface Mount | Mounting Plate | Warm White - 2700 K | Non-Directional | Input power 90~130 VAC | Beveled Edge | Gloss White | XXXX |
| | 1 × 2 ft. | Pendant Mount | Hanging Kit | Neutral - 3000 k | | Input power 100~277 VAC | Flat Edge Switch | Gloss Yellow | XXXX |
| | 2 × 2 ft. | Serviceable | | | | Dimming | | Gloss Orange | XXXX |
| | 1.5 × 4 ft. | Non- | | Bright White - 4000 K | | No Dimming | | Gloss Green | XXXX |
| | 2 × 4 ft. | serviceable | | Daylight - 6500 K | | A-B-A-B Driver | | Oil Rubbed Bronze | XXXX |
| | | | | 1100 lumens | | | | Satin Nickel | XXXX |
| | | | | 2500 lumens | | | | | |

TABLE B-continued

LED LIGHT FIXTURE SPECIFICATIONS BY PRODUCT FAMILY

| | Fixture/Base Specifications | | | Component Specifications | | | Top Specifications | | |
|---|---|---|---|---|---|---|---|---|---|
| Prod- | Fixture/Base form factors | | | LEDs Array | Optically | Driving Circuitry | Top Assembly exterior aspect | | |
| uct Family | Size | Fixture/Base Configuration | Accessories | Color Temperature, Luminous Flux | Transmissive Panel Assembly Directionality | Input Power. Advanced Features | Bezel Configuration | Finish | SKU No. |
| 2 | 4 × 12 in. 4 × 18 in. 4 × 24 in. 4 × 36 in. 4 × 42 in. | Master module Slave module | | Warm White - 2700 K Bright White - 4000 K 2500 lumens 4300 lumens | 45° beam angle 60° beam angle normal peak angle 20° peak angle 40° peak angle | Input power 90~130 VAC Dimming No Dimming Master-Slave Driver | Beveled Edge Flat Edge Switch | Gloss White Oil Rubbed Bronze Satin Nickel | XXXX XXXX XXXX XXXX XXXX |
| 3 | 4 × 4 in. 6 × 6 in. 8 × 8 in. | Recessed Frame | | Warm White - 2700 K Bright White - 4000 K 1100 lumens 2500 lumens | Non-Directional 20° beam angle | Input power 90~130 VAC Input power 100~277 VAC Dimming No Dimming | Flat Edge No Switch Recess mount bezel | Gloss White Oil Rubbed Bronze Satin Nickel Unfinished Metal | XXXX XXXX XXXX XXXX |
| 4 | 6 × 6 in. 8 × 8 in. | IP 54 IP 65 Non-serviceable | | Neutral - 3000 k | Non-Directional | Input power 90~130 VAC No Dimming | Beveled Flat Edge No Switch | Gloss White Oil Rubbed Bronze Satin Nickel Unfinished Metal | XXXX XXXX |

The invention claimed is:

1. An LED (light emitting diode) panel lighting fixture, comprising:
a top, comprising:
a top frame including a bezel surrounding a light emitting area;
a base, comprising:
a circular base frame, wherein the top frame and the circular base frame are separate parts and the top frame is configured to be joined to the base frame to form an assembled frame;
an LED strip comprising a plurality of LEDs disposed within a channel of the circular base frame and adjacent a first edge surface at an indentation of an indented circular optically transmissive panel;
the indented circular optically transmissive panel, for distribution of light received from the LED strip at the first edge surface of the indented circular optically transmissive panel to the light emitting area;
an LED driver disposed within the channel of the circular base frame between a second edge surface of the indented circular optically transmissive panel and the circular base frame, the LED driver being configured to convert an AC power input from an external AC power supply to a DC power output for the LED strip;
wherein a mounting plate for the base contains a plurality of apertures including holes and slots configured in a circle, wherein the holes and slots are configured in a circle for securing the LED panel lighting fixture to a ceiling box that contains the external AC power supply.

2. The LED (light emitting diode) panel lighting fixture of claim 1, wherein the plurality of apertures further includes a central opening of the mounting plate for the base, further comprising wiring carrying AC power in from the external AC power supply to the LED driver, wherein the wiring is routed into the base through the central opening of the mounting plate for the base.

3. The LED (light emitting diode) panel lighting fixture of claim 1, wherein the base includes a power connector coupled to the LED driver as an additional component, and source power connector coupled to the external AC power supply as an additional component.

4. The LED (light emitting diode) panel lighting fixture of claim 1, further comprising mechanical fasteners for surface mounting the LED panel lighting fixture to a surface, wherein the mechanical fasteners are accessible before joining the top to the base but are covered by the top and are not accessible after joining the top to the base.

5. The LED (light emitting diode) panel lighting fixture kit of claim 1, wherein the base includes a mechanism for mounting the base within a recess in a wall or ceiling, and wherein the top includes a trim ring for sealing the recess.

6. The LED (light emitting diode) panel lighting fixture of claim 1, wherein the second edge of the top frame comprises a first edge wall portion, that forms an interference fit with a second edge wall portion of the base frame.

7. The LED (light emitting diode) panel lighting fixture of claim 1, wherein the holes and slots configured in a circle are arranged to accommodate several types of the ceiling box that contains the external AC power supply.

* * * * *